United States Patent
Ishikawa

(10) Patent No.: US 7,333,035 B2
(45) Date of Patent: Feb. 19, 2008

(54) DATA ENCODING APPARATUS, DATA DECODING APPARATUS, DATA ENCODING METHOD, DATA DECODING METHOD, AND RECORDING MEDIUM RECORDED WITH PROGRAM

(75) Inventor: Takashi Ishikawa, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/437,497

(22) Filed: May 19, 2006

(65) Prior Publication Data

US 2006/0262858 A1 Nov. 23, 2006

(30) Foreign Application Priority Data

May 23, 2005 (JP) ............................. 2005-149884

(51) Int. Cl.
*H03M 7/46* (2006.01)
(52) U.S. Cl. ........................................................ 341/63
(58) Field of Classification Search ................ 341/50, 341/51, 63, 67; 382/232, 233
See application file for complete search history.

(56) References Cited

U.S. PATENT DOCUMENTS 5,764,374 A  6/1998  Seroussi

| | | | |
|---|---|---|---|
| 6,229,854 B1 * | 5/2001 | Kikuchi et al. | 375/240.27 |
| 6,785,422 B2 * | 8/2004 | Bossen | 382/232 |
| 2005/0058437 A1 * | 3/2005 | Meier et al. | 386/112 |

\* cited by examiner

*Primary Examiner*—Brian Young
(74) *Attorney, Agent, or Firm*—Straub and Pokotylo; John C. Pokotylo

(57) ABSTRACT

This data encoding apparatus includes: a predictor for calculating a prediction value of target data; a subtractor for calculating the difference between the target data and the prediction value as a prediction error value; an absolute value calculator for calculating the absolute value of the prediction error value; a flatness detector for detecting the number of the absolute prediction error values continuously equal to or lower than a predetermined threshold for some thresholds, and setting a code length candidate for each threshold by comparing the detected number with a predetermined run length; a k parameter determinator for determining the code length of a fixed length code part on the basis of the code length candidate of each threshold; and a Golomb-Rice encoder for encoding the absolute prediction error value in accordance with the determined code length by dividing it into a variable length and the fixed length code parts.

14 Claims, 20 Drawing Sheets

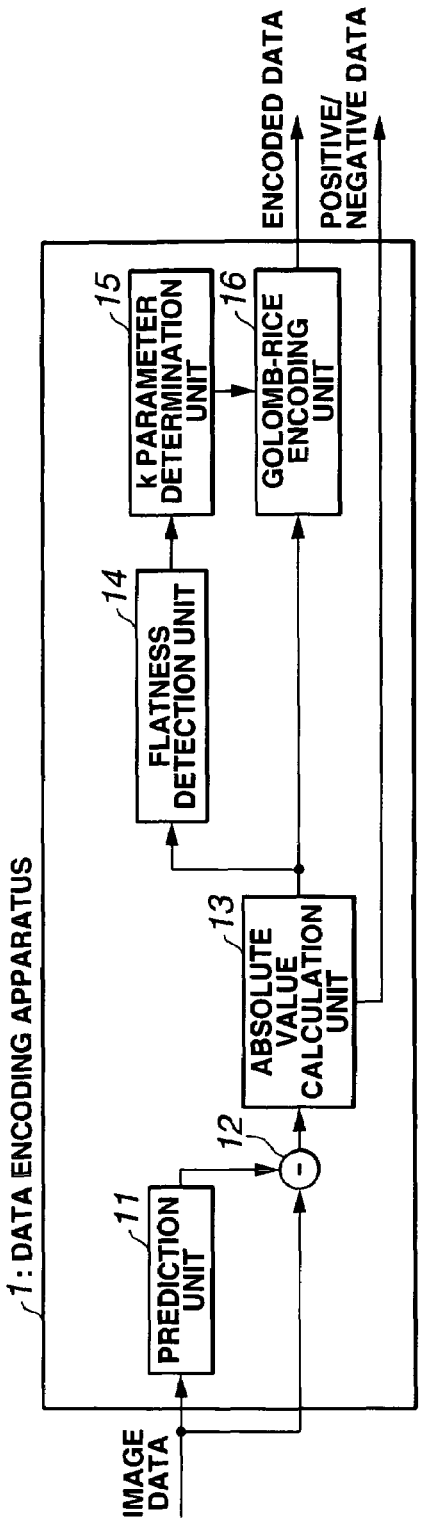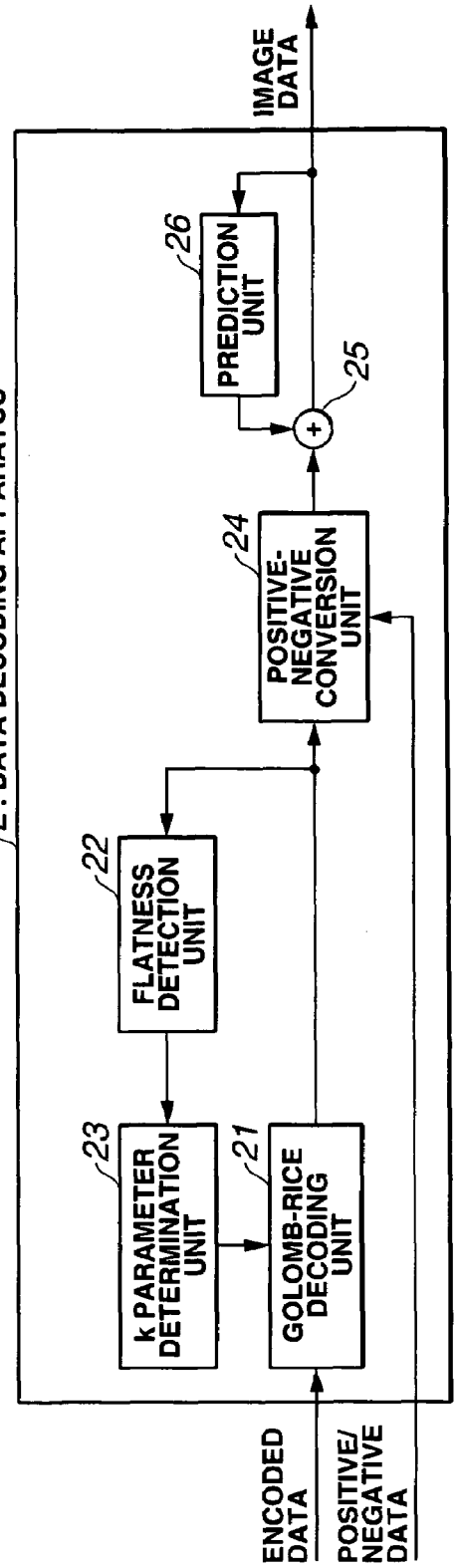

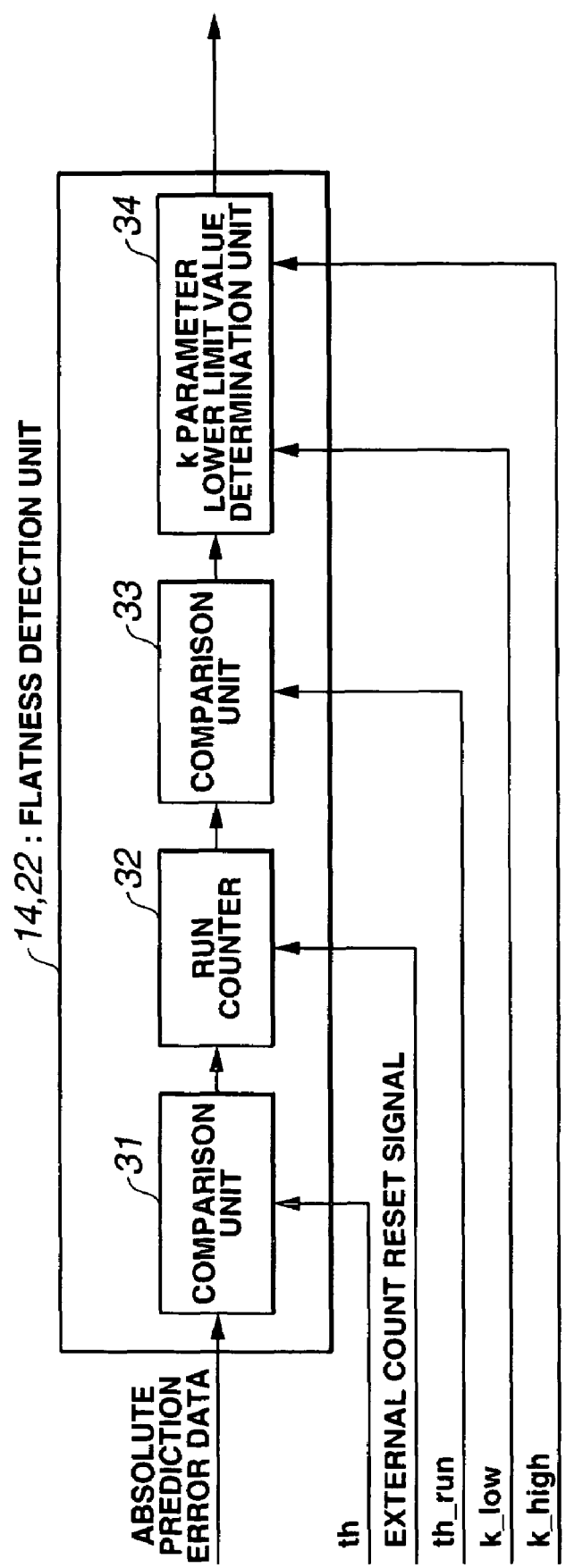

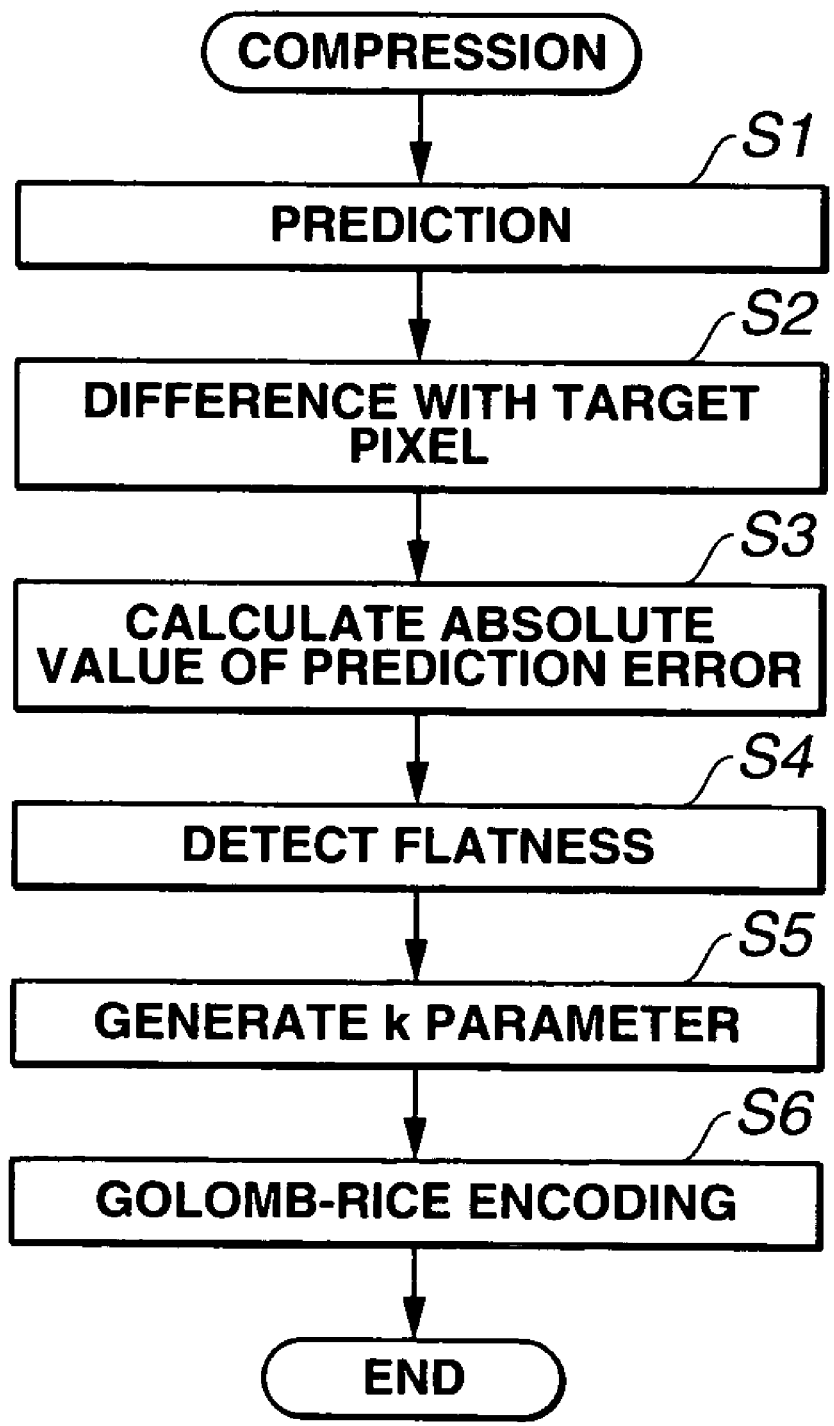

FIG.12

| ABSOLUTE VALUE DATA | PREDICTION ERROR VALUE |
|---|---|
| 0 | 0 |
| 1 | 1 |
| 2 | -1 |
| 3 | 2 |
| 4 | -2 |
| 5 | 3 |
| 6 | -3 |
| 7 | 4 |
| 8 | -4 |
| 9 | 5 |
| ... | ... |

FIG.13

| FLATNESS DETECTION 1 | | FLATNESS DETECTION 2 | |
|---|---|---|---|
| th1 | 15 | th2 | 31 |
| th_run1 | 2 | th_run2 | 2 |
| k_low1 | 2 | k_low2 | 4 |
| k_high1 | 5 | k_high2 | 5 |

FIG.14

| CONDITION | k PARAMETER |
|---|---|
| TWO PIXELS PREVIOUS TO PRECEDING PIXEL NO GREATER THAN th1 | 2 |
| TWO PIXELS PREVIOUS TO PRECEDING PIXEL EXCEED th1 AND NO GREATER THAN th2 | 4 |
| ALL OTHER TIMES | 5 |

FIG. 16

| 49 | 49 | 46 | 56 | 50 | 38 | 14 | 30 | 67 | 33 | 19 | 37 | 65 | 60 | 43 | 92 | 151 | 164 | 151 | 123 | 86 | 71 | 88 | 23 | 27 | 86 | 23 | 4 | 38 | 13 | 5 | 3 |

FIG. 17

| 49 | 0 | -3 | 10 | -6 | -12 | -24 | 16 | 37 | -34 | -14 | 18 | 28 | -5 | -17 | 49 | 59 | 13 | -13 | -28 | -37 | -15 | 17 | -65 | 4 | 59 | -63 | -19 | 34 | -25 | -8 | -2 |

FIG. 18

| 49 | 0 | 2 | 10 | 5 | 11 | 23 | 16 | 37 | 33 | 13 | 18 | 28 | 4 | 16 | 49 | 59 | 13 | 12 | 27 | 36 | 14 | 17 | 64 | 4 | 59 | 62 | 18 | 34 | 24 | 7 | 1 |

FIG.20

| PIXEL POSITION | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| ABSOLUTE PREDICTION ERROR DATA | 49 | 0 | 2 | 10 | 5 | 11 | 23 | 16 | 37 | 33 | 13 | 18 | 28 | 4 | 16 | 49 | 59 | 13 | 12 | 27 | 36 | 14 | 17 | 64 | 4 | 59 | 62 | 18 | 34 | 24 | 7 | 32 |
| run_count1 | 0 | 0 | 1 | 2 | 3 | 4 | 5 | 0 | 0 | 0 | 0 | 1 | 0 | 0 | 1 | 0 | 0 | 0 | 1 | 2 | 0 | 0 | 1 | 0 | 0 | 1 | 0 | 0 | 0 | 0 | 0 | 1 |
| run_count2 | 0 | 0 | 1 | 2 | 3 | 4 | 5 | 0 | 6 | 7 | 0 | 1 | 2 | 0 | 1 | 5 | 0 | 0 | 1 | 2 | 3 | 0 | 1 | 2 | 0 | 1 | 0 | 0 | 1 | 0 | 1 | 2 |
| k_param1 | 5 | 5 | 5 | 2 | 2 | 2 | 2 | 5 | 5 | 5 | 5 | 5 | 5 | 5 | 5 | 5 | 5 | 5 | 5 | 2 | 5 | 5 | 5 | 5 | 5 | 5 | 5 | 5 | 5 | 5 | 5 | 5 |
| k_param2 | 5 | 5 | 5 | 4 | 2 | 2 | 2 | 4 | 4 | 5 | 5 | 5 | 4 | 4 | 4 | 4 | 5 | 5 | 5 | 4 | 4 | 5 | 5 | 4 | 5 | 5 | 5 | 5 | 5 | 5 | 5 | 5 |
| k_param LOWER LIMIT VALUE | 5 | 5 | 5 | 2 | 2 | 2 | 2 | 4 | 4 | 4 | 5 | 5 | 4 | 4 | 4 | 4 | 5 | 5 | 5 | 4 | 4 | 4 | 5 | 4 | 5 | 5 | 5 | 5 | 5 | 5 | 5 | 4 |

FIG.21

| | FIXED LENGTH | k_param FIXED | | EMBODIMENT |
|---|---|---|---|---|
| | | k=2 | k=5 | |
| CODE AMOUNT | 256 | 277 | 203 | 204 |
| COMPRESSION RATIO | - | 108 | 79 | 80 |

FIG.22

| 58 | 52 | 55 | 62 | 62 | 58 | 58 | 55 | 49 | 58 | 47 | 44 | 46 | 47 | 49 | 50 | 52 | 52 | 52 | 44 | 43 | 42 | 43 | 47 | 46 | 49 | 52 | 49 | 46 | 40 |

FIG.23

| 58 | -6 | 3 | 7 | 0 | -4 | -3 | 3 | -9 | -2 | -3 | 3 | -3 | 2 | 1 | 3 | 1 | 2 | 0 | 0 | -8 | -1 | -1 | 1 | 4 | -1 | 3 | 3 | -3 | -6 |

FIG.24

| 58 | 5 | 3 | 7 | 0 | 3 | 2 | 3 | 8 | 1 | 2 | 3 | 2 | 2 | 1 | 3 | 1 | 2 | 0 | 0 | 7 | 0 | 0 | 1 | 4 | 0 | 3 | 3 | 2 | 5 |

FIG.26

| PIXEL POSITION | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| ABSOLUTE PREDICTION ERROR DATA | 58 | 5 | 3 | 7 | 0 | 3 | 2 | 3 | 8 | 1 | 2 | 3 | 2 | 2 | 1 | 0 | 3 | 1 | 2 | 0 | 0 | 7 | 0 | 0 | 1 | 4 | 0 | 3 | 3 | 2 | 2 | 5 |
| run_count1 | 0 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| run_count2 | 0 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| k_param1 | 5 | 5 | 5 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| k_param2 | 5 | 5 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| k_param LOWER LIMIT VALUE | 5 | 5 | 5 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |

FIG.27

| | FIXED LENGTH | k_param FIXED | | EMBODIMENT |
|---|---|---|---|---|
| | | k=2 | k=5 | |
| CODE AMOUNT | 256 | 117 | 193 | 112 |
| COMPRESSION RATIO | — | 46 | 75 | 44 |

FIG.31

| PIXEL POSITION | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| ABSOLUTE PREDICTION ERROR DATA | 49 | 0 | 2 | 10 | 5 | 11 | 23 | 16 | 37 | 33 | 13 | 18 | 28 | 4 | 16 | 49 | 59 | 13 | 12 | 27 | 36 | 14 | 17 | 64 | 4 | 59 | 62 | 18 | 34 | 24 | 7 | 1 |
| run_count1 | 0 | 0 | 1 | 2 | 3 | 4 | 5 | 0 | 0 | 0 | 0 | 0 | 1 | 0 | 0 | 1 | 0 | 0 | 1 | 2 | 0 | 0 | 1 | 0 | 0 | 1 | 0 | 0 | 0 | 0 | 0 | |
| run_count2 | 0 | 0 | 1 | 2 | 3 | 4 | 5 | 6 | 7 | 0 | 0 | 1 | 2 | 3 | 4 | 5 | 0 | 0 | 1 | 2 | 3 | 0 | 1 | 2 | 0 | 1 | 0 | 0 | 1 | 0 | 1 | 2 |
| k_param1 | 5 | 5 | 5 | 2 | 2 | 2 | 2 | 5 | 5 | 5 | 5 | 5 | 5 | 5 | 5 | 5 | 5 | 5 | 5 | 2 | 5 | 5 | 5 | 5 | 5 | 5 | 5 | 5 | 5 | 5 | 5 | 5 |
| k_param2 | 5 | 5 | 5 | 4 | 4 | 4 | 4 | 4 | 4 | 5 | 5 | 5 | 5 | 5 | 4 | 4 | 5 | 5 | 5 | 4 | 4 | 5 | 5 | 4 | 5 | 5 | 5 | 5 | 5 | 5 | 5 | 4 |
| pre_range | 5 | 6 | 1 | 2 | 4 | 3 | 4 | 5 | 5 | 6 | 6 | 5 | 5 | 3 | 4 | 5 | 6 | 6 | 4 | 4 | 5 | 6 | 4 | 5 | 7 | 3 | 6 | 6 | 5 | 6 | 5 | 3 |
| k_param | 5 | 6 | 5 | 2 | 4 | 3 | 4 | 5 | 5 | 6 | 6 | 5 | 5 | 4 | 4 | 5 | 6 | 6 | 5 | 4 | 5 | 6 | 5 | 5 | 7 | 5 | 6 | 6 | 5 | 6 | 5 | 4 |

FIG.32

| | FIXED LENGTH | k_param FIXED | | EMBODIMENT |
|---|---|---|---|---|
| | | k=2 | k=5 | |
| CODE AMOUNT | 256 | 277 | 203 | 207 |
| COMPRESSION RATIO | - | 108 | 79 | 81 |

FIG.33

| PIXEL POSITION | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| ABSOLUTE PREDICTION ERROR DATA | 58 | 5 | 3 | 7 | 0 | 3 | 2 | 3 | 8 | 1 | 2 | 3 | 2 | 2 | 1 | 0 | 1 | 2 | 0 | 0 | 7 | 0 | 0 | 1 | 4 | 0 | 3 | 3 | 2 | 2 | 5 |  |
| run_count1 | 0 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| run_count2 | 0 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
| k_param1 | 5 | 5 | 5 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| k_param2 | 5 | 5 | 5 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| pre_range | 5 | 6 | 3 | 2 | 3 | 1 | 2 | 2 | 2 | 4 | 1 | 2 | 2 | 2 | 2 | 1 | 2 | 1 | 2 | 1 | 1 | 3 | 1 | 1 | 1 | 1 | 3 | 1 | 2 | 2 | 2 | 2 |
| k_param | 5 | 6 | 5 | 2 | 3 | 2 | 2 | 2 | 2 | 4 | 2 | 2 | 2 | 2 | 2 | 2 | 2 | 2 | 2 | 2 | 2 | 3 | 2 | 2 | 2 | 2 | 3 | 2 | 2 | 2 | 2 | 2 |

FIG.34

|  | FIXED LENGTH | k_param FIXED | | EMBODIMENT |
|---|---|---|---|---|
|  |  | k=2 | k=5 |  |
| CODE AMOUNT | 256 | 117 | 193 | 118 |
| COMPRESSION RATIO | - | 46 | 75 | 46 |

DATA ENCODING APPARATUS, DATA DECODING APPARATUS, DATA ENCODING METHOD, DATA DECODING METHOD, AND RECORDING MEDIUM RECORDED WITH PROGRAM

This application claims benefit of Japanese Application No. 2005-149884 filed in Japan on May 23, 2005, the contents of which are incorporated by this reference.

BACKGROUND OF THE INVENTION

1. Field of the Invention

This invention relates to a data encoding apparatus, a data decoding apparatus, a data encoding method, a data decoding method, and a recording medium recorded with a program, which are used to encode or decode data by separating the data into a variable length code part and a fixed length code part.

2. Description of Related Art

In an image capturing apparatus such as a digital camera, image capturing data known as RAW data are recorded onto a recording medium in single lens reflex type models and the like, for example. These RAW data are obtained through the implementation of simple analog processing on an image signal obtained from an image capturing element, followed by conversion into digital data. In recent years, the number of pixels in the image capturing element of a digital camera has increased, leading to an increase in the data size of the RAW data. Accordingly, digital cameras which perform compression processing on the RAW data to reduce the size of the data also exist. However, it is assumed that the RAW data will be retouched by a user, and therefore when compression processing is performed, it is desirable that the compression processing be lossless compression.

It is generally desirable for a compression method to have a high compression ratio, but in the case of a compression method applied to an image capturing apparatus such as a digital camera, in contrast to a compression method applied to a single personal computer or the like, several additional requirements, such as the following, for example, arise from specification limitations and the like.

(1) The processing time should be short.

(2) The buffer amount required for the processing should be small.

Requirement (1) relates to continuous shooting performance, battery consumption, and soon, for example. Requirement (2) relates to the cost, size, weight, and so on of the digital camera.

However, attempts to satisfy both requirement (1) and requirement (2) result in the increased likelihood of a deterioration in the compression performance.

U.S. Pat. No. 5,764,374, for example, may be cited as a compression technique proposed in the prior art. U.S. Pat. No. 5,764,374 proposes a method of classifying conditions according to the gradient of pixels on the periphery of an encoding target pixel and setting a k parameter during Golomb-Rice encoding in the respective conditions.

However, with the technique described in U.S. Pat. No. 5,764,374, a table of the appearance frequency and accumulated error must be created for each condition before calculation processing is performed, leading to an increase in buffer use, and hence the aforementioned requirement (2) is not sufficiently satisfied. Furthermore, the conditions of the peripheral pixels are divided in relation to the encoding target pixel, leading to an increase in processing, and hence requirement (1) is not sufficiently satisfied either.

SUMMARY OF THE INVENTION

An object of this invention is to provide a data encoding apparatus, a data encoding method, and a recording medium recorded with a program, which are capable of achieving a short processing time, a small amount of required memory, and a favorable compression performance.

Another object of this invention is to provide a data decoding apparatus, a data decoding method, and a recording medium recorded with a program, which are capable of decoding compressed data in a short processing time and using a small amount of memory.

In short, this invention is a data encoding apparatus comprising: a data converter adapted to convert data into prediction error data through adaptive prediction of the data; a run counter adapted to detect the number of pieces of the prediction error data, without a break, equal to or lower than a predetermined threshold; a code length setting portion adapted to set a code length of a fixed length code part of the prediction error data in accordance with the number detected by the run counter; and an encoder adapted to encode the prediction error data by dividing the prediction error data into a variable, length code part and the fixed length code part.

This invention is also a data encoding method comprising converting data into prediction error data through adaptive prediction of the data; detecting the number of pieces of the prediction error data, without a break, equal to or lower than a predetermined threshold; setting a code length of a fixed length code part of the prediction error data in accordance with the detected number; and encoding the prediction error data by dividing the prediction error data into a variable length code part and the fixed length code part.

This invention is also a recording medium recorded with a computer-executable program which, when executed by a computer, performs a method comprising converting data into prediction error data through adaptive prediction of the data; detecting the number of pieces of the prediction error data, without a break, equal to or lower than a predetermined threshold; setting a code length of a fixed length code part of the prediction error data in accordance with the detected number; and encoding the prediction error data by dividing the prediction error data into a variable length code part and the fixed length code part.

This invention is also a data decoding apparatus comprising: a prediction error data decoder adapted to determine prediction error data by dividing encoded data into a variable length code part and a fixed length code part to decode the encoded data; a target data decoder adapted to determine, adaptively, target data from the prediction error data decoded by the prediction error data decoder a run counter adapted to detect, with respect to prediction error data relating to data immediately preceding the target data decoded by the prediction error data decoder, the number of pieces of the prediction error data, without a break, equal to or lower than a predetermined threshold; and a code length setting portion adapted to set a code length of the fixed length code part of the encoded data in accordance with the number detected by the run counter, wherein the prediction error data decoder is adapted to decode the encoded data by dividing the encoded data into the variable length code part and the fixed length code part in accordance with the code length set by the code length setting portion, thereby determining the prediction error data.

In addition, this invention is a data decoding method comprising determining prediction error data by dividing encoded data into a variable length code part and a fixed length code part to decode the encoded data; determining adaptively target data from the decoded prediction error data; detecting, with respect to prediction error data relating to data immediately preceding the decoded target data, the number of pieces of the prediction error data, without a break, equal to or lower than a predetermined threshold; and setting a code length of the fixed length code part of the encoded data in accordance with the detected number, wherein, in the step of determining prediction error data, the encoded data are decoded by dividing the encoded data into the variable length code part and the fixed length code part in accordance with the code length set in the step of setting the code length of the fixed length code part, and thus the prediction error data are determined.

Furthermore, this invention is a recording medium recorded with a computer-executable program which, when executed by a computer, performs a method comprising determining prediction error data by dividing encoded data into a variable length code part and a fixed length code part to decode the encoded data; determining adaptively target data from the decoded prediction error data; detecting, with respect to prediction error data relating to data immediately preceding the decoded target data, a number of pieces of the prediction error data, without a break, equal to or lower than a predetermined threshold; and setting a code length of the fixed length code part of the encoded data in accordance with the detected number, wherein, in the step of determining prediction error data, the encoded data are decoded by dividing the encoded data into the variable length code part and the fixed length code part in accordance with the code length set in the step of setting the code length of the fixed length code part, and thus the prediction error data are determined.

The above and other objects, features, and advantages of the invention will become more clearly understood from the following description referring to the accompanying drawings.

BRIEF DESCRIPTION OF THE DRAWINGS

FIG. 1 is a block diagram showing the constitution of a data encoding apparatus according to a first embodiment of the present invention;

FIG. 2 is a block diagram showing the constitution of a data decoding apparatus in the first embodiment;

FIG. 3 is a block diagram showing the constitution of a flatness detection unit in the first embodiment;

FIG. 4 is a flowchart showing an outline of the flow of compression processing performed by the data encoding apparatus of the first embodiment;

FIG. 12 is a table showing another example of absolute value calculation in the first embodiment;

FIG. 13 is a table showing various thresholds and set values used in the pixel-unit flatness detection of the first embodiment;

FIG. 14 is a table showing a setting example of a k parameter corresponding to a threshold in the first embodiment;

FIG. 16 is a diagram showing an example of one line of the image data for processing by the data encoding apparatus in the first embodiment, the image data line having a comparatively high degree of randomness;

FIG. 17 is a diagram showing prediction error values calculated from the image data of FIG. 16 by the data encoding apparatus of the embodiment;

FIG. 18 is a diagram showing absolute values of the prediction error values, obtained from the prediction error values of FIG. 17 by the data encoding apparatus of the first embodiment;

FIG. 20 is a table showing values of a run counter and the k parameter, set in accordance with the absolute prediction error data shown in FIG. 18, according to the first embodiment;

FIG. 21 is a table showing a compression ratio obtained by the techniques of the first embodiment in relation to the image data shown in FIG. 16, in comparison with a compression ratio obtained when the k parameter is fixed;

FIG. 22 is a diagram showing an example of one line of the image data subjected to processing by the data encoding apparatus in the first embodiment, the image data line having a comparatively low degree of randomness;

FIG. 23 is a diagram showing prediction error values calculated from the image data of FIG. 22 by the data encoding apparatus of the first embodiment;

FIG. 24 is a diagram showing absolute prediction error values, obtained from the prediction error values of FIG. 23 by the data encoding apparatus of the embodiment;

FIG. 26 is a table showing values of the run counter and the k parameter, set in accordance with the absolute prediction error data shown in FIG. 24, according to the first embodiment;

FIG. 27 is a table showing the compression ratio obtained by the techniques of the first embodiment in relation to the image data shown in FIG. 22, in comparison with a compression ratio obtained when the k parameter is fixed;

FIG. 31 is a table showing values of the run counter and the k parameter, set in accordance with the absolute prediction error data shown in FIG. 18, according to the second embodiment;

FIG. 32 is a table showing the compression ratio obtained by the techniques of the second embodiment in relation to the image data shown in FIG. 16, in comparison with a compression ratio obtained when the k parameter is fixed;

FIG. 33 is a table showing values of the run counter and the k parameter, set in accordance with the absolute prediction error data shown in FIG. 24, according to the second embodiment; and FIG. 34 is a table showing the compression ratio obtained by the techniques of the second embodiment in relation to the image data shown in FIG. 22, in comparison with a compression ratio obtained when the k parameter is fixed.

DETAILED DESCRIPTION OF PREFERRED EMBODIMENTS

Figure 5:
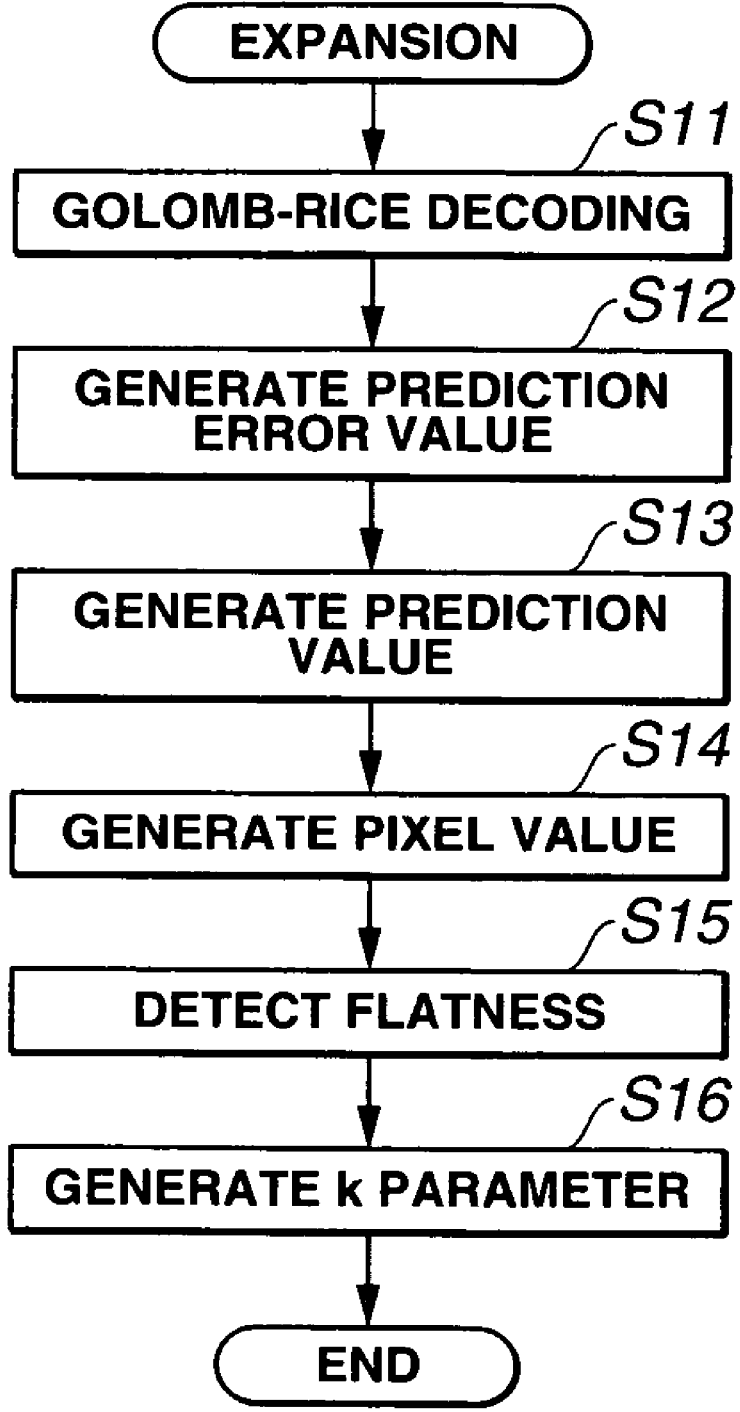
FIG. 5 is a flowchart showing an outline of the flow of expansion processing performed by the data decoding apparatus of the first embodiment.

Embodiments of the present invention will be described below with reference to the drawings.

First Embodiment

FIGS. 1 through 27 show a first embodiment of the present invention. FIG. 1 is a block diagram showing the constitution of a data encoding apparatus, and FIG. 2 is a block diagram showing the constitution of a data decoding apparatus.

As shown in FIG. 1, a data encoding apparatus 1 is constituted of a prediction unit 11, a subtractor 12, an absolute value calculation unit 13, a flatness detection unit 14, a k parameter determination unit 15, and a Golomb-Rice encoding unit 16. Image data are input into the prediction unit 11 and subtractor 12, positive/negative data are output from the absolute value calculation unit 13, and encoded data are output from the Golomb-Rice encoding unit 16. The data encoding apparatus 1 will be described in further detail below along the description of actions with reference to FIG. 4, FIGS. 6 through 10, and so on.

Data compressed by the data encoding apparatus 1 are decoded by a data decoding apparatus 2 as shown in FIG. 2. The data decoding apparatus 2 is constituted of a Golomb-Rice decoding unit 21, a flatness detection unit 22, a k parameter determination unit 23, a positive-negative conversion unit 24, an adder 25, and a prediction unit 26. The encoded data are input into the Golomb-Rice decoding unit 21, the positive/negative data are input into the positive-negative conversion unit 24, and image data are output from the adder 25. The actions of the data decoding apparatus 2 will be described in further detail below with reference to FIG. 5 and so on.

Note that in FIGS. 1 and 2, the operation timing of each block is adjusted by a timing adjustment circuit not shown in the drawings.

The flatness detection unit 14 of the data encoding apparatus 1 or the flatness detection unit 22 of the data decoding apparatus 2 is constituted as shown in FIG. 3. FIG. 3 is a block diagram showing the constitution of the flatness detection unit.

The flatness detection unit 14, 22 is constituted of a comparison unit 31, a run counter 32, a comparison unit 33, and a k parameter lower limit value determination unit 34. Prediction error data converted to an absolute value and a threshold th are input into the comparison unit 31, an external count reset signal is input into the run counter 32, a threshold th_run is input into the comparison unit 33, and k_low and k_high are input into the k parameter lower limit value determination unit 34. The actions of the flatness detection unit 14, 22 will also be described in detail below.

FIG. 4 is a flowchart showing an outline of the flow of the compression processing performed by the data encoding apparatus 1.

Compression processing by the data encoding apparatus 1 is basically performed by carrying out a series of processes such as that shown in FIG. 4.

First, pixel data for processing are predicted on the basis of pixel data that have already been read (step S1).

Next, a prediction error value is generated by differentiating the actual value of the pixel data for processing and the prediction value predicted in the step S1 (step S2).

Next, the prediction error value is converted into an absolute value (step S3), the absolute prediction error value is delayed by one pixel, and then the flatness detection processing to be described below is performed (step S4).

Then, in accordance with the flatness detection result, a k parameter indicating the code length of a fixed length code part obtained during Golomb-Rice encoding is determined (step S5). The absolute prediction error value is then subjected to Golomb-Rice encoding on the basis of the determined k parameter (step S6), whereupon the routine ends.

Figure 6:
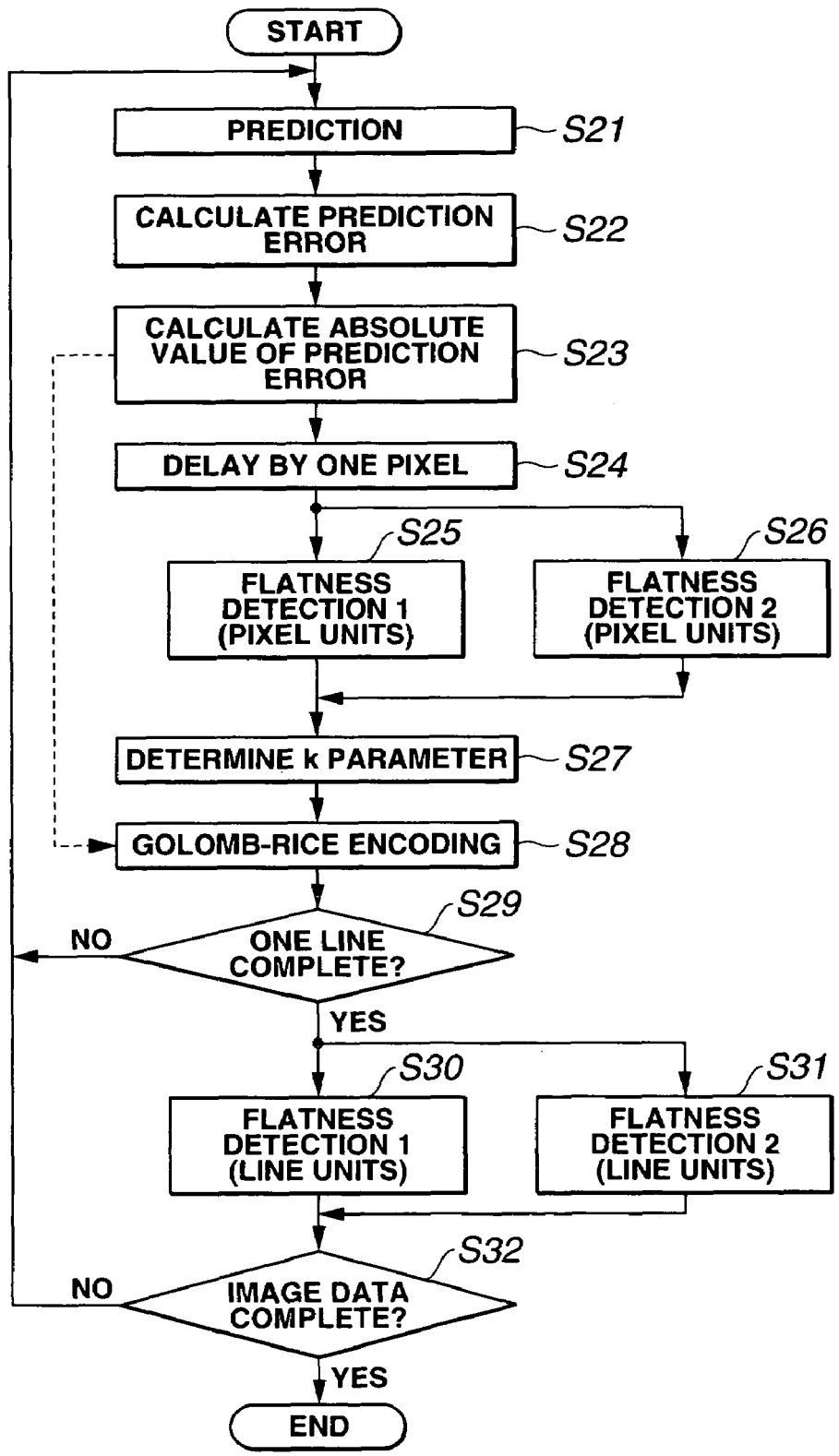
FIG. 6 is a flowchart showing in detail the compression processing performed by the data encoding apparatus of the first embodiment.
Figure 7:
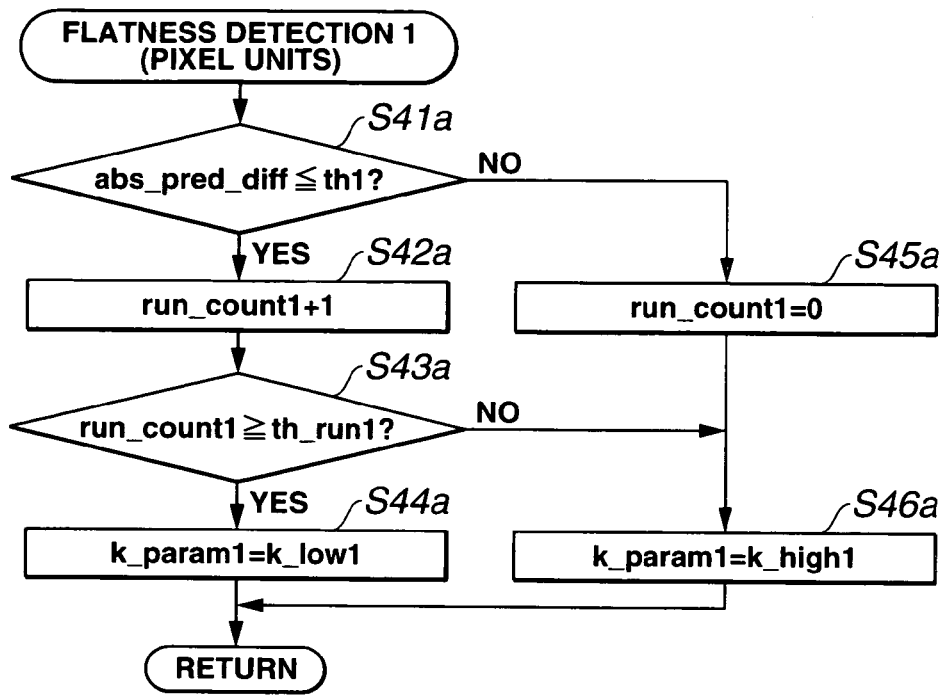
FIG. 7 is a flowchart showing the processing of flatness detection 1, performed in pixel units, in the first embodiment.
Figure 8:
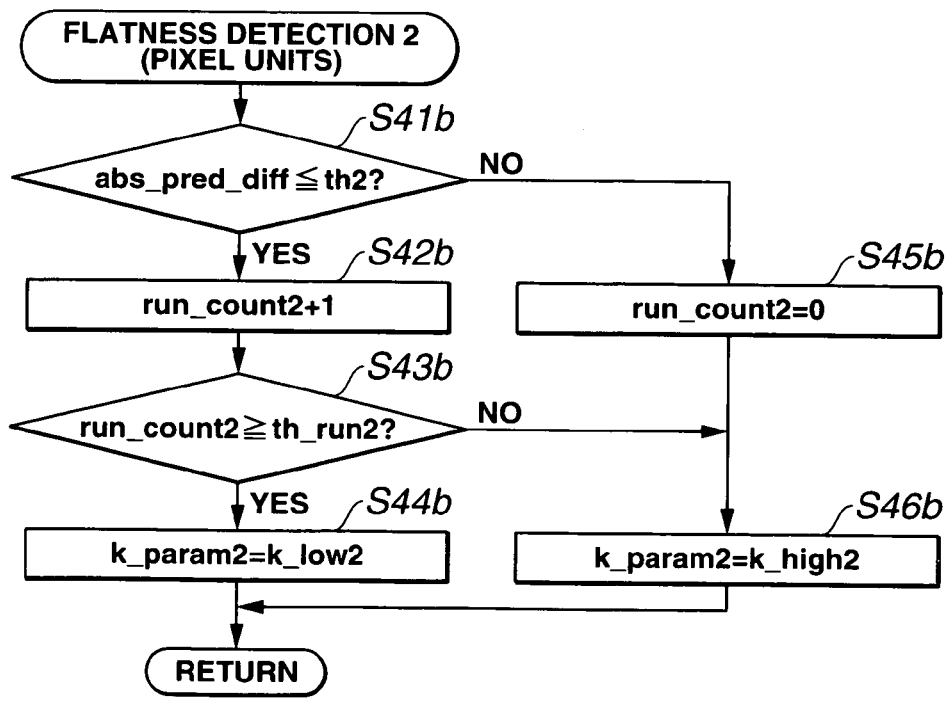
FIG. 8 is a flowchart showing the processing of flatness detection 2, performed in pixel units, in the first embodiment.
Figure 9:
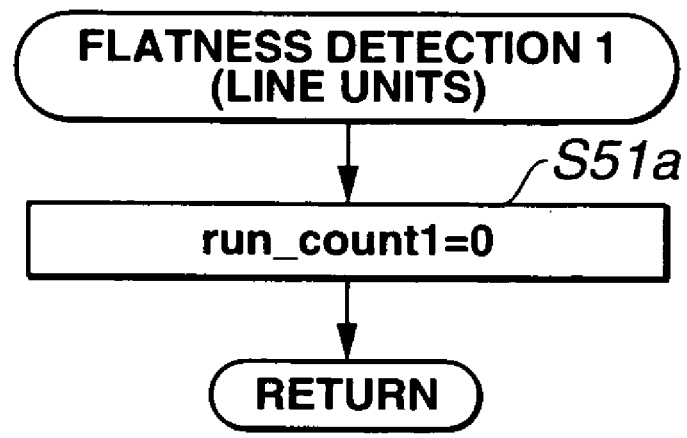
FIG. 9 is a flowchart showing the processing of flatness detection 1, performed in line units, in the first embodiment.
Figure 10:
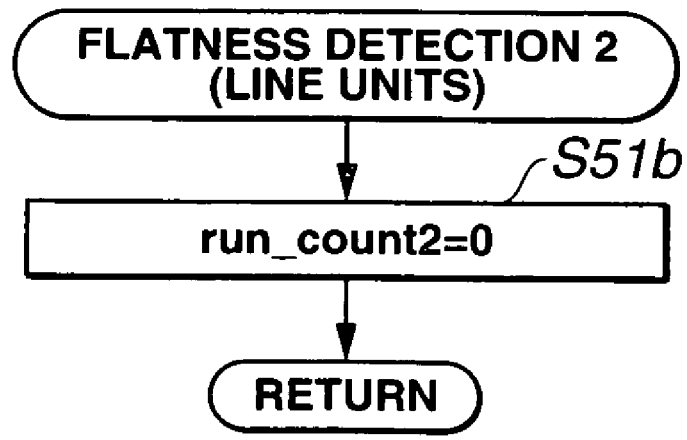
FIG. 10 is a flowchart showing the processing of flatness detection 2, performed in line units, in the first embodiment.
Figure 15:
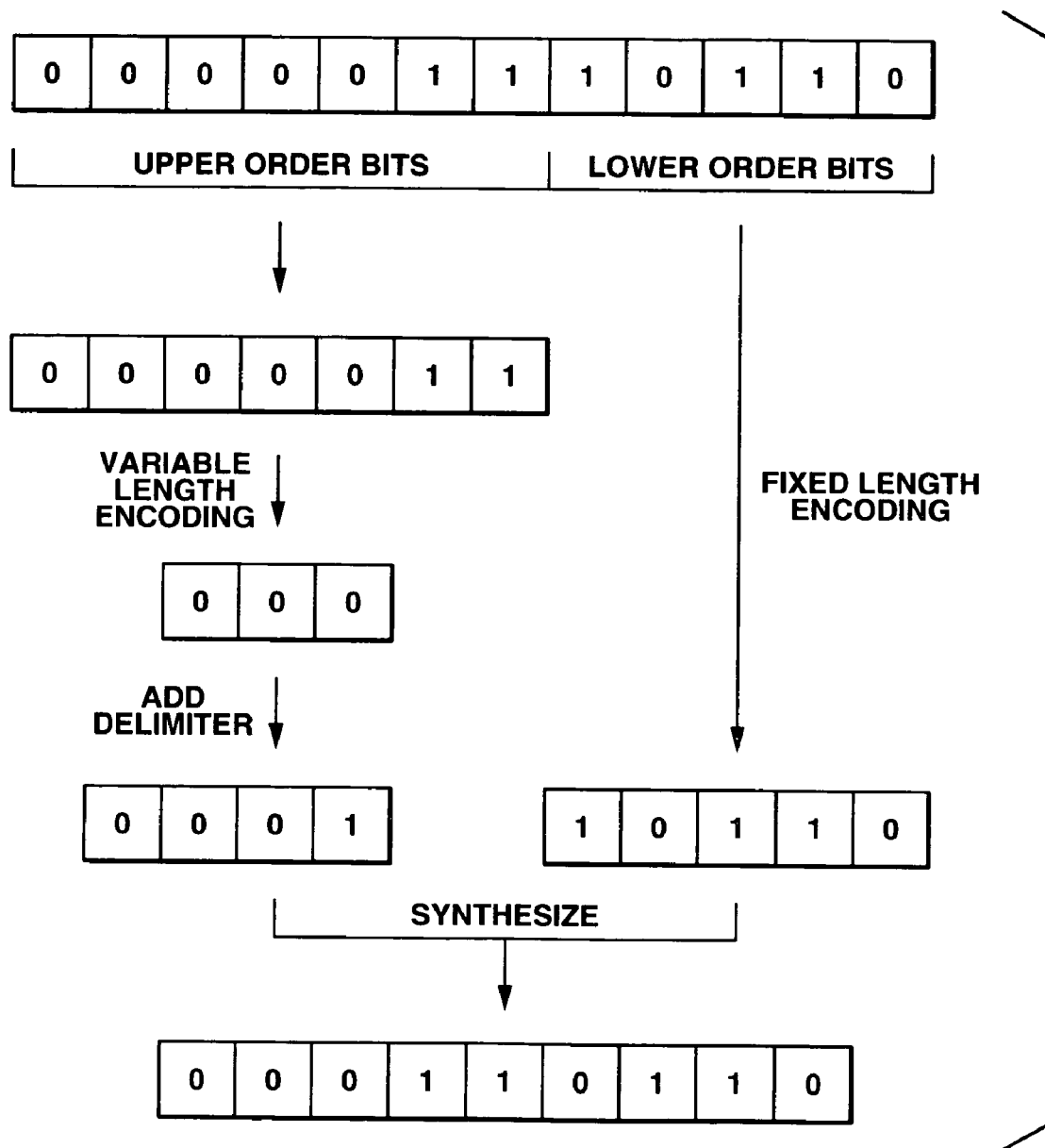
FIG. 15 is a diagram showing an example of Golomb-Rice encoding in the first embodiment.

The compression processing performed in the flow will now be described in detail with reference to FIGS. 6 to 15. FIG. 6 is a flowchart showing in detail the compression processing performed by the data encoding apparatus 1, FIG. 7 is a flowchart showing the processing of flatness detection 1 performed in pixel units, FIG. 8 is a flowchart showing the processing of flatness detection 2 performed in pixel units, FIG. 9 is a flowchart showing the processing of flatness detection 1 performed in line units, FIG. 10 is a flowchart showing the processing of flatness detection 2 performed in line units, FIG. 1 is a diagram showing the arrangement of a target pixel and neighboring pixels read prior to the target pixel, FIG. 12 is a table showing another example of absolute value calculation, FIG. 13 is a table showing various thresholds and set values used during flatness detection in pixel units, FIG. 14 is a table showing a setting example of a k parameter corresponding to a threshold, and FIG. 15 is a diagram showing an example of Golomb-Rice encoding.

Figure 11:
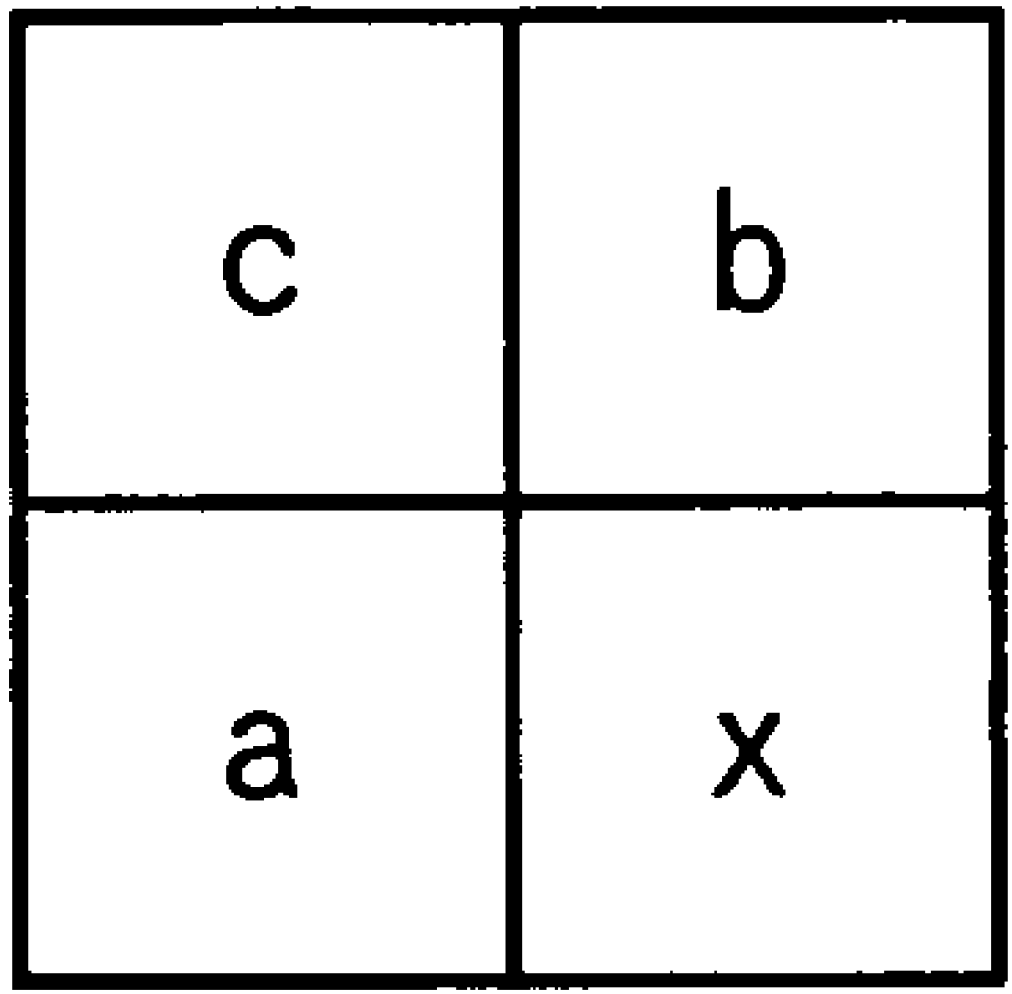
FIG. 11 is a diagram showing the arrangement of a target pixel and neighboring pixels read prior to the target pixel in the first embodiment.

To begin the processing shown in FIG. 6, a prediction value is calculated (step S21) (corresponding to the step S1 in FIG. 4). To calculate the prediction value, the pixel value of a target pixel is predicted on the basis of the pixel data that have already been scanned, and here, the values of pixels in the neighborhood of the target pixel are used as shown in FIG. 11. In FIG. 11, the target pixel is denoted by x, the pixel directly to the left of the target pixel is denoted by a, the pixel directly above the target pixel is denoted by b, and the pixel to the upper left of the target pixel is denoted by c. Assuming that the pixel values of the pixels a, b, c are Ra, Rb, Rc, respectively, and that the prediction value of the target pixel x is Px, then the prediction value Px is calculated by the prediction unit 11, which sences as a part of data converting means, on the basis of the spatial correlation between the pixel data, using a prediction equation such as that shown in Formula 1 below, for example.

$$Px = \max(Ra, Rb) \text{ (when } Rc < \min(Ra, Rb))$$

$$Px = \min(Ra, Rb) \text{ (when } Rc > \max(Ra, Rb))$$

$$Px = Ra + Rb - Rc \text{ (at all other times)} \quad \text{[Formula 1]}$$

Here, the symbol max (x, y) on the right side of Formula 1 indicates that either larger value of x and y is taken, while the symbol min (x, y) indicates that either smaller value of x and y is taken. These symbols will be used similarly hereafter.

Note that although a prediction equation suitable for edge detection, such as that shown in Formula 1, is used here, the applicable prediction equation is not limited thereto, and various other prediction equations may be used. For example, the following Formulas 2 to 8 may be cited as other examples of prediction equations. First, in Formula 2, the pixel value Ra of the pixel a directly to the left of the target pixel is set as the prediction value Px of the target pixel x. In so doing, an accurate prediction value can be obtained when the degree of correlation between pixels in the horizontal direction is high.

$$Px=Ra \quad \text{[Formula 2]}$$

In Formula 3, the pixel value Rb of the pixel b directly above the target pixel is set as the prediction value Px of the target pixel x. In so doing, an accurate prediction value can be obtained when the degree of correlation between pixels in the vertical direction is high.

$$Px=Rb \quad \text{[Formula 3]}$$

In Formula 4, the pixel value Rc of the pixel c to the upper left of the target pixel is set as the prediction value Px of the target pixel x. In so doing, an accurate prediction value can be obtained when the degree of correlation between pixels in a diagonal direction extending from upper left to lower right is high.

$$Px=Rc \quad \text{[Formula 4]}$$

In Formula 5, the pixel value Ra of the pixel a directly to the left of the target pixel x is added to the pixel value Rb of the pixel b directly above the target pixel x, the pixel value Rc of the pixel c to the upper left of the target pixel x is subtracted therefrom, and the resulting value is set as the prediction value Px of the target pixel x. In so doing, an accurate prediction value can be obtained when the rate of change in the pixel value of the pixel in the diagonal direction extending from upper left to lower right is regular.

$$Px=Ra+Rb-Rc \quad \text{[Formula 5]}$$

In Formula 6, a value obtained by subtracting the pixel value Rc of the pixel c to the upper left of the target pixel x from the pixel value Rb of the pixel b directly above the target pixel x and dividing the result by two is added to the pixel value Ra of the pixel a directly to the left of the target pixel x, and the resulting value is set as the prediction value Px of the target pixel x. In so doing, an accurate prediction value can be obtained when the rate of change in the pixel values of the pixels in the horizontal direction is regular.

$$Px=Ra+\{(Rb-Rc)/2\} \quad \text{[Formula 6]}$$

In Formula 7, a value obtained by subtracting the pixel value Rc of the pixel c to the upper left of the target pixel x from the pixel value Ra of the pixel a directly to the left of the target pixel x and dividing the result by two is added to the pixel value Rb of the pixel b directly above the target pixel x, and the resulting value is set as the prediction value Px of the target pixel x. In so doing, an accurate prediction value can be obtained when the rate of change in the pixel values of the pixels in the vertical direction is regular.

$$Px=Rb+\{(Ra-Rc)/2\} \quad \text{[Formula 7]}$$

In Formula 8, an average value of the pixel value Ra of the pixel a directly to the left of the target pixel x and the pixel value Rb of the pixel b directly above the target pixel x is set as the prediction value Px of the target pixel x. In so doing, an accurate prediction value can be obtained when the degree of correlation with the peripheral pixels is high (when the image is comparatively flat, for example).

$$Px=(Ra+Rb)/2 \quad \text{[Formula 8]}$$

Note that the above prediction formulas are not limited to singular use in relation to a single set of image data, and may be used in combination. More specifically, for example, even when a prediction equation such as that of Formula 2 is employed as the main prediction equation, a prediction equation such as that shown in Formula 3 may be used in combination when the pixel at the left side end of a line is the target pixel so that no pixels exist to the left thereof. Moreover, the prediction equation is not limited to those described above, and the prediction value may be calculated using the pixel data for one or more arbitrary pixels which have been read prior to the target pixel and are close to the target pixel in terms of spatial distance.

Next, the subtractor 12, which serves as a part of the data converting means, calculates a prediction error value pred_diff by subtracting the prediction value Px from the actual pixel value Rx of the target pixel, as shown in Formula 9 (step S22) (corresponding to the step S2 in FIG. 4).

$$\text{pred\_diff}=Rx-Px \quad \text{[Formula 9]}$$

Next, the absolute value calculation unit 13 calculates the absolute value of the prediction error value pred_diff to obtain an absolute prediction error value abs_pred_diff (step S23) (corresponding to the step S3 in FIG. 4). Various methods exist for calculating the absolute value, and calculating means such as that shown in the following Formula 10 may be cited as an example.

$$\text{abs\_pred\_diff}=\text{pred\_diff} \text{ (when pred\_diff} \geq 0)$$

$$\text{abs\_pred\_diff}=\text{abs(pred\_diff)}-1 \text{ (when pred\_diff}<0) \quad \text{[Formula 10]}$$

Here, the abs ( ) on the right side of the second equation indicates an absolute value.

When the absolute value calculation unit 13 determines the absolute value through calculation such as that shown in Formula 10, data indicating a code (positive/negative data) are output separately as shown in FIG. 1 and so on.

As shown in FIG. 12, the absolute value may also be calculated using a sequential method in which absolute value data of "0" is applied to a prediction error value of "0", absolute value data of "1" is applied to a prediction error value of "1", absolute value data of "2" is applied to a prediction error value of "−1", absolute value data of "3" is applied to a prediction error value of "2", absolute value data of "4" is applied to a prediction error value of "−2", and so on.

Note that the present invention is not limited to these methods, and the absolute value may be calculated using other means.

The absolute prediction error value abs_pred_diff calculated in this manner serves as the data to be subjected to Golomb-Rice encoding, and is used in the processing of a step S28 to be described below and in the following manner to determine the aforementioned k parameter.

In order to perform processing for determining the k parameter, first the absolute prediction error value abs_pred_diff calculated in the manner described above is delayed by one pixel (step S24).

Next, on the basis of the absolute prediction error value abs_pred_diff of the preceding pixel in the scanning sequence, pixel-unit flatness detection 1 processing is performed on the basis of a comparison with a first threshold (step S25), and pixel-unit flatness detection 2 processing is performed on the basis of a comparison with a second threshold (step S26).

The pixel-unit flatness detection 1 processing of the step S25 is performed as shown in FIG. 7.

To begin this processing, the comparison unit 31 determines whether or not the absolute prediction error value abs_pred_diff is no greater than a predetermined threshold th1 (step S41a).

When the absolute corrected prediction error value abs_pred_diff is no greater than the threshold th1, a run counter run_count1 provided in the run counter 32 is incremented (in FIG. 7, an increment is denoted by the symbol "run_count1+1") (step S42a). The run counter run_count1 is used to count the number of pixels having, without a break an absolute prediction error value abs_pred_diff no greater than the threshold th1.

The comparison unit 33 then determines whether or not the run counter run_count1 is equal to or greater than a threshold th_run1 indicating a predetermined run length (step S43a).

When the run counter run_count1 is equal to or greater than the threshold th_run1, the k parameter lower limit value determination unit 34 stores a predetermined k parameter set value k_low1 as a k parameter candidate k_param1 (step S44a).

When it is determined in the step S41a that the absolute prediction error value abs_pred_diff is greater than the predetermined threshold th1, the run counter 32 initializes (i.e. stores "0" in) the run counter run_count1 (step S45a).

When the step S45a is complete or it is determined in the step S43a that the run counter run_count1 is smaller than the threshold th_run1, the k parameter lower limit value determination unit 34 stores a predetermined k parameter set value k_high1 (here, k_high1>k_low1) as the k parameter candidate k_param1 (step S46a).

Once the step S44a or the step S46a is complete, the routine returns to the processing shown in FIG. 6.

The pixel-unit flatness detection 2 processing of the step S26 is as shown in FIG. 8. In the processing shown in FIG. 8, steps S41b to S46b correspond respectively to the steps S41a to S46a of the processing shown in FIG. 7, with the threshold th1 replaced by a threshold th2 (th2>th1), the run counter run_count1 replaced by a run counter run_count2, the threshold th_run1 indicating a predetermined run length replaced by a threshold th_run2, the predetermined k parameter set value k_low1 replaced by a predetermined k parameter set value k_low2 (k_low2>k_low1), the predetermined k parameter set value k_high1 replaced by a predetermined k parameter set value k_high2 (k_high2>k_low2), and the k parameter candidate k_param1 replaced by a k parameter candidate k_param2.

Note that the various thresholds and set values used in the pixel-unit flatness detection 1 processing shown in FIG. 7 and the pixel-unit flatness detection 1 processing shown in FIG. 8 are set specifically as shown in FIG. 13, for example. That is, the threshold th1 is "15", the threshold th2 is "31", the threshold th_run1 is "2", the threshold th_run2 is "2", the k parameter set value k_low1 is "2", the k parameter set value k_low2 is "4", the k parameter set value k_high1 is "5", and the k parameter set value k_high2 is "5".

The processing of the steps S24 to S26 described above corresponds partially to the processing of the step S4 in FIG. 4.

Then, based on the results of the processing performed respectively in the steps S25 and S26, or in other words the k parameter candidate k_param1 calculated in the step S25 and the k parameter candidate k_param2 calculated in the step S26, the k parameter determination unit 15, which serves as code length setting means, determines the k parameter k_param as shown in the following Formula 11 (step S27) (corresponding to the step S5 of FIG. 4).

$$k\_param=\min(k\_param1, k\_param2) \qquad \text{[Formula 11]}$$

As a result of this processing, the k parameter k_param is determined as shown in FIG. 14. More specifically, as shown in FIG. 13, in a case where the thresholds th_run1, th_run2 denoting the predetermined run length are both set as "2" and the k parameter set values k_low1, k_low2, k_high1, k_high2 are applied as shown in FIG. 13, the k parameter k_param is set to "2" when two pixels previous to the preceding pixel (including the preceding pixel) are equal to or smaller than the threshold th1, to "4" when two pixels previous to the preceding pixel (including the preceding pixel) are greater than the threshold th1 and equal to or smaller than the threshold th2, and to "5", at all other times.

Next, on the basis of the calculated k parameter k_param, the Golomb-Rice encoding unit 16, which serves as encoding means, subjects the absolute prediction error value abs_pred_diff determined in the step S23 to Golomb-Rice encoding (step S28) (corresponding to the step S6 in FIG. 4). To provide a specific example, as shown in FIG. 15, when the absolute prediction error value abs_pred_diff is expressed in binary as "000001110110" and the k parameter k_param is "5", the five lower order bits "10110" form the fixed length code part. When the remaining upper order bits "0000011" are expressed as a decimal, they become "3", and hence the variable length code part is "000", becoming "0001" after the addition of a delimiter "1" to the next thereof. The parts are then synthesized such that the code obtained through Golomb-Rice encoding is "000110110". Thus twelve-bit information is compressed into nine bits.

Once Golomb-Rice encoding for one pixel is complete, a determination is made as to whether or not the pixel is the final pixel of the line, or in other words whether encoding of a single line is complete (step S29).

When it is determined that the line has not yet been completely encoded, the routine returns to the step S21, where the processing described above is repeated on the following pixel of the same line.

On the other hand, when it is determined in the step S29 that the line has been completely encoded, line-unit flatness detection 1 processing (step S30) (corresponding to a part of the step S4 in FIG. 4) and line-unit flatness detection 2 processing (step S31) (corresponding to a part of the step S4 in FIG. 4) are performed.

As shown in FIG. 9, the line-unit flatness detection 1 processing of the step S30 is performed by having the run counter 32 initialize (i.e. store "0" in) the run counter run_count1 in response to an external count reset signal (step S51a).

Similarly, as shown in FIG. 10, the line-unit flatness detection 2 processing of the step S31 is performed by having the run counter 32 initialize (i.e. store "0" in) the run counter run_count2 in response to an external count reset signal (step S51b).

Once the processing of the steps S30 and S31 is complete, a determination is made as to whether or not all of the lines in the image data have been processed, or in other words whether or not all of the image data have been processed (step S32). If not, the routine returns to the step S21, where the processing described above is repeated on the pixels of the next line.

When it is determined in the step S32 that all of the image data have been processed, the processing ends.

Next, referring to FIGS. 16 through 21, a specific example of the encoding of a single line of image data having a comparatively high degree of randomness will be described.

Figure 19:
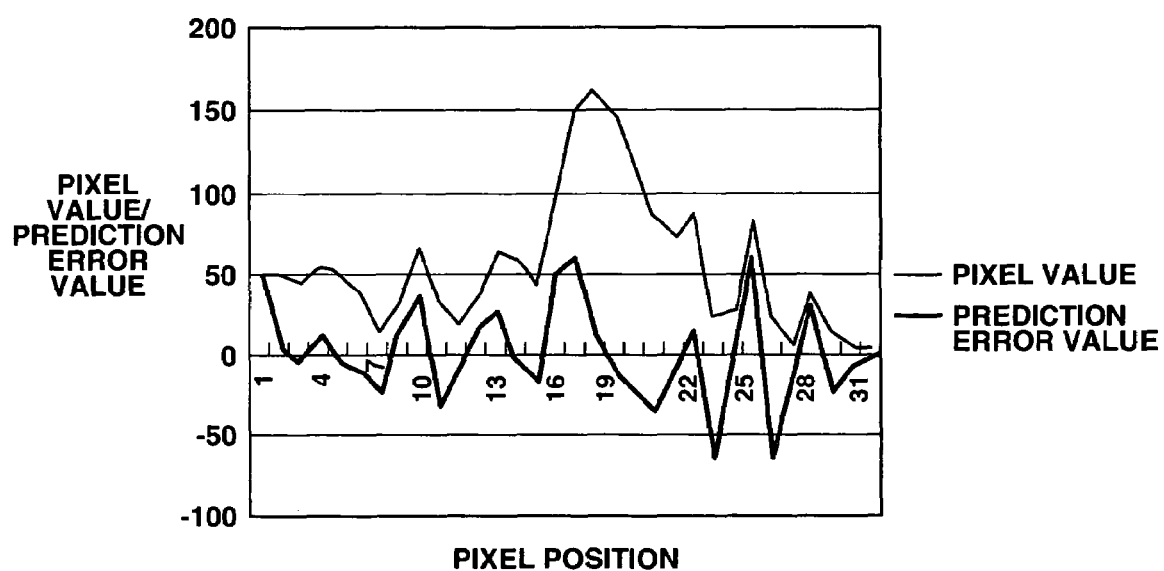
FIG. 19 is a diagram showing the pixel values of the image data of FIG. 16 and the prediction error values of FIG. 17.

Here, FIG. 16 is a diagram showing an example of one line of the image data subjected to processing by the data encoding apparatus 1, the image data line having a comparatively high degree of randomness, FIG. 17 is a diagram showing prediction error values calculated from the image data of FIG. 16 by the data encoding apparatus 1, FIG. 18 is a diagram showing absolute values of the prediction error values, obtained from the prediction error values of FIG. 17 by the data encoding apparatus 1, FIG. 19 is a diagram showing the pixel values of the image data of FIG. 16 and the prediction error values of FIG. 17, FIG. 20 is a table showing values of the run counter and the k parameter, set in accordance with the absolute prediction error data shown in FIG. 18, and FIG. 21 is a table showing a compression ratio obtained by the techniques of this embodiment in relation to the image data shown in FIG. 16, in comparison with a compression ratio obtained when the k parameter is fixed.

First, a case such as that shown in FIG. 16, in which a single line of image data constituted of 32 pixels is input into the data encoding apparatus 1, will be described.

Using pixel values that have been read in the past, the prediction unit 11 predicts the pixel value of the target pixel in accordance with Formula 2, for example. Note that since the pixel at the head of the line cannot be predicted using Formula 2, the prediction value thereof is set to "0".

Next, the subtractor 12 calculates the prediction error values shown in FIG. 17 on the basis of Formula 9.

The pixel values of the image data shown in FIG. 16 and the prediction error values shown in FIG. 17 are distributed as shown in FIG. 19, and thus it can be seen that the data used in this example have a comparatively high degree of randomness.

The absolute value calculation unit 13 then calculates the absolute values of the prediction error values as shown in FIG. 18 on the basis of Formula 10.

The absolute prediction error values are delayed by one pixel, whereupon the flatness detection 1 processing is performed by the flatness detection unit 14 with the threshold th1 set at "15", and the flatness detection 2 processing is performed by the flatness detection unit 14 with the threshold th2 set at "31", as shown in FIG. 20.

For example, the absolute prediction error values are, without a break, equal to or lower than 15 from the second pixel to the sixth pixel, whereas the seventh pixel exceeds 15. Hence, during flatness detection 1 relating to the seventh pixel (since the pixels are delayed by one pixel, the absolute prediction error value of the sixth pixel is used), the run counter run_count1 indicates "5", and during flatness detection 1 relating to the eighth pixel, the run counter run_count1 is reset to "0".

Accordingly, the run counter run_count1 is less than 2 from the first pixel through the third pixel, and therefore the k parameter candidate k_param1 is 5(=k_high1), but from the fourth pixel to the seventh pixel, the run counter run_count1 is equal to or greater than 2, and therefore the k parameter candidate k_param1 is 2(=k_low1).

Similarly, the absolute prediction error values are, without a break equal to or lower than 31 from the second pixel to the eighth pixel, whereas the ninth pixel exceeds 31. Hence, during flatness detection 2 relating to the ninth pixel (since the pixels are delayed by one pixel, the absolute prediction error value of the eighth pixel is used), the run counter run_count2 indicates "7", and during flatness detection 2 relating to the tenth pixel, the run counter run_count2 is reset to "0".

Accordingly, the run counter run_count2 is less than 2 from the first pixel through the third pixel, and therefore the k parameter candidate k_param2 is 5(=k_high2), but from the fourth pixel to the ninth pixel, the run counter run_count2 is equal to or greater than 2, and therefore the k parameter candidate k_param2 is 4(=k_low2).

The k parameter determination unit 15 then sets the either smaller value of the k parameter candidate k_param1 and the k parameter candidate k_param2 as the k parameter k_param as shown in Formula 11, and hence the k parameter k_param is set at 5 from the first pixel to the third pixel, at 2 from the fourth pixel to the seventh pixel, at 4 for the eighth and ninth pixels, and so on.

By performing this processing from the first pixel to the thirty-second pixel, the values shown in FIG. 20 are obtained.

FIG. 21 shows a comparison between the results of encoding performed by the Golomb-Rice encoding unit 16 using the adaptively calculated k parameter k_param and the results of encoding performed by the Golomb-Rice encoding unit 16 using a fixed k parameter k_param.

Here, an example is used in which the dynamic range of the pixel values is 0 to 255, or in other words the pixel values are expressed in 8 bits. Thus the data amount for 32 pixels is 256 bits.

The code amount when the k parameter is fixed at 2, for example, is 277 bits, and hence the code amount increases beyond the code amount prior to encoding, leading to a compression ratio of 108. When the k parameter is fixed at 5, for example, the code amount is 203 bits and the compression ratio is 79. The reason for this is that due to the high degree of randomness in the image data, the prediction error value, which is the difference between the prediction value and the pixel value, is large, and hence a higher compression ratio can be obtained by setting the k parameter to be slightly high.

In contrast, when an adaptive k parameter such as that described above in this embodiment is used, the code amount is 204 and the compression ratio is 80, and hence it is possible to obtain a comparatively high compression ratio which is substantially identical to the compression ratio obtained when the k parameter is fixed at 5.

Next, a specific example of the encoding of a single line of image data having a comparatively low degree of randomness will be described with reference to FIGS. 22 through 27.

Figure 25:
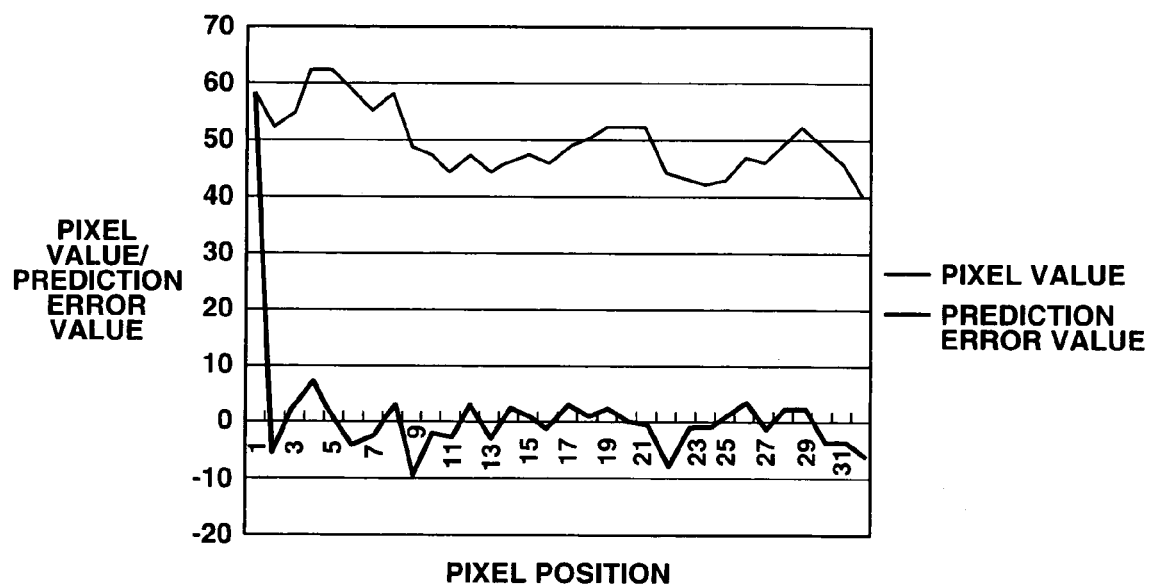
FIG. 25 is a diagram showing the pixel values of the image data of FIG. 22 and the prediction error values of FIG. 23.

Here, FIG. 22 is a diagram showing an example of one line of the image data subjected to processing by the data encoding apparatus 1, the image data line having a comparatively low degree of randomness, FIG. 23 is a diagram showing prediction error values calculated from the image data of FIG. 22 by the data encoding apparatus 1, FIG. 24 is a view showing absolute prediction error values, obtained from the prediction error values of FIG. 23 by the data encoding apparatus 1, FIG. 25 is a diagram showing the pixel values of the image data of FIG. 22 and the prediction error values of FIG. 23, FIG. 26 is a table showing values of the run counter and the k parameter, set in accordance with the absolute prediction error data shown in FIG. 24, and FIG. 27 is a table showing the compression ratio obtained by the techniques of the first embodiment in relation to the image data shown in FIG. 22, in comparison with a compression ratio obtained when the k parameter is fixed.

Note that similarly to the example shown in FIG. 16 through 21, it is assumed that the thresholds and set values of FIG. 13 are used in the example shown in FIGS. 22 through 27.

Here, a case such as that shown in FIG. 22, in which a single line of image data constituted of 32 pixels is input into the data encoding apparatus 1, will be described.

Using pixel values that have been read in the past, the prediction unit 11 predicts the pixel value of the target pixel in accordance with Formula 2, whereupon the subtractor 12 calculates the prediction error values shown in FIG. 23 on the basis of Formula 9.

Here, the pixel values of the image data shown in FIG. 22 and the prediction error values shown in FIG. 23 are distributed as shown in FIG. 25, and hence the data used in this example have a low degree of randomness in comparison with the distribution shown in FIG. 19.

The absolute value calculation unit 13 then calculates the absolute values of the prediction error values as shown in FIG. 24 on the basis of Formula 10.

The absolute prediction error values are delayed by one pixel, whereupon the flatness detection 1 processing is performed by the flatness detection unit 14 with the threshold th1 set at "15", and the flatness detection 2 processing is performed by the flatness detection unit 14 with the threshold th2 set at "31".

In this case, the absolute prediction error value exceeds 15 solely in the first pixel, and from the second pixel through the thirty-second pixel, the absolute prediction error values are, without a break equal to or lower than 15. Hence, during flatness detection 1, the k parameter candidate k_param1 is set at 5(=k_high1) from the first pixel to the third pixel, and, without a break, at 2(=k_low1) from the fourth pixel to the thirty-second pixel, as shown in FIG. 26.

Similarly, the absolute prediction error value exceeds 31 solely in the first pixel, and from the second pixel through the thirty-second pixel, the absolute prediction error values are, without a break, equal to or lower than 31. Hence, during flatness detection 2, the k parameter candidate k_param2 is set at 5(=k_high2) from the first pixel to the third pixel, and, without a break, at 4(=k_low2) from the fourth pixel to the thirty-second pixel, as shown in FIG. 26.

Hence, on the basis of Formula 11, the k parameter determination unit 15 sets the k parameter k_param at 5 from the first pixel to the third pixel and at 2 from the fourth pixel to the thirty-second pixel.

FIG. 27 shows a comparison between the results of encoding performed by the Golomb-Rice encoding unit 16 using the adaptively calculated k parameter k_param and the results of encoding performed by the Golomb-Rice encoding unit 16 using a fixed k parameter k_param.

As described above, the data amount of 32 pixels is 256 bits.

When the k parameter is fixed at 2, the code amount is 117 bits and the compression ratio is 46. When the k parameter is fixed at 5, the code amount is 193 bits and the compression ratio is 75. The reason for this is that due to the comparatively low randomness of the image data, the prediction error value, which is the difference between the prediction value and the pixel value, is small, and hence a higher compression ratio can be obtained by setting the k parameter to be slightly low.

In contrast, when an adaptive k parameter such as that described above in the first embodiment is used, the code amount is 112 and the compression ratio is 44, and hence it is possible to obtain a slightly higher compression ratio than the compression ratio obtained when the k parameter is set at 2.

Comparing the results shown in FIG. 21 with the results shown in FIG. 27, when the k parameter is fixed, k=5 enables a high compression ratio to be obtained in relation to random data having a high degree of randomness, while k=2 enables a high compression ratio to be obtained in relation to data having a low degree of randomness. Conversely, however, k=2 leads to a compression ratio exceeding 100 in relation to random data having a high degree of randomness, and k=5 does not lead to a particularly high compression ratio in relation to data having a low degree of randomness. According to the first embodiment, on the other hand, a high compression ratio can be achieved with stability in relation to both data having a high degree of randomness and data having a low degree of randomness.

FIG. 5 is a flowchart showing an outline of the flow of expansion processing performed by the data decoding apparatus 2.

To begin this processing, the Golomb-Rice decoding unit 21, which serves as prediction error data decoding means, performs Golomb-Rice decoding using a procedure reverse to that described in the step S28 of FIG. 6, and thereby calculates the absolute prediction error value abs_pred_diff (step S11). Note that the absolute prediction error value abs_pred_diff is also used to determine the k parameter of the following pixel, as will be described below.

Next, the positive-negative conversion unit 24 uses the positive/negative data to calculate the prediction error value pred_diff from the absolute prediction error value abs_pred_diff (step S12).

Next, the prediction unit 26, which serves as a part of target data decoding means, generates the prediction value Px in accordance with any of the above Formulas 1 through 8 using a pixel value that has already been calculated (step S13).

The adder 25, which serves as a part of the target data decoding means, then calculates the pixel value Rx on the basis of the prediction value Px and the prediction error value pred_diff using the following Formula 12.

$$Rx = Px + \text{pred\_diff} \qquad \text{[Formula 12]}$$

The pixel value Rx calculated in this manner serves as the output data of the data decoding apparatus 2.

The absolute prediction error value abs_pred_diff output from the Golomb-Rice decoding unit 21 is delayed by one pixel, whereupon the k parameter candidates k_param1, k_param2 are calculated as described above by the flatness detection unit 22 on the basis of the two thresholds th1, th2 (step S15).

Then, on the basis of these calculation results, the k parameter determination unit 23, serving as the code length setting means, determines the k parameter as shown in Formula 11 (step S16).

According to the first embodiment, the flatness in the neighborhood of a target pixel is determined and the k parameter is set adaptively in accordance with the flatness. As a result, a high compression ratio can be achieved.

Furthermore, the pixel values of adjacent pixels are compared with a predetermined threshold, and when the pixel values are equal to or lower than the threshold without a break, the pixels are counted by a run counter. When the count reaches or exceeds a predetermined run length, it is determined that the neighborhood of the target pixel is flat, and in this manner the amount of required memory can be reduced.

Further, a plurality of threshold types (in the above example two types, th1 and th2, are used, but the present invention is not limited to two types) are provided as the predetermined thresholds employed during flatness determination, and hence the flatness can be determined with a high degree of precision.

In addition, the compressed data can be decoded in a short processing time and with a small amount of memory.

Second Embodiment

Figure 28:
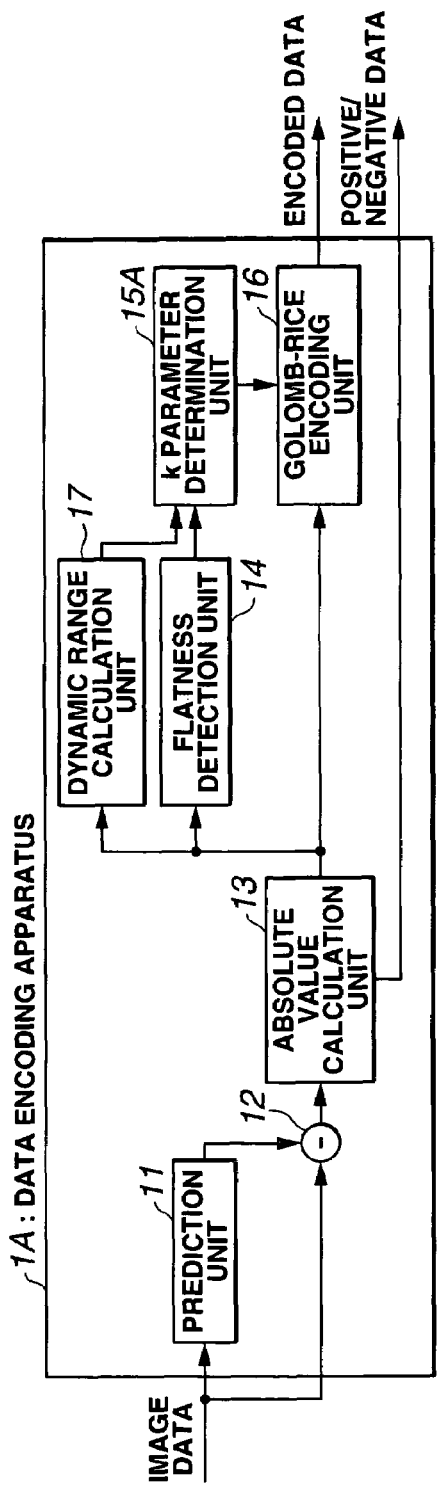
FIG. 28 is a block diagram showing the constitution of a data encoding apparatus according to a second embodiment of the present invention.
Figure 29:
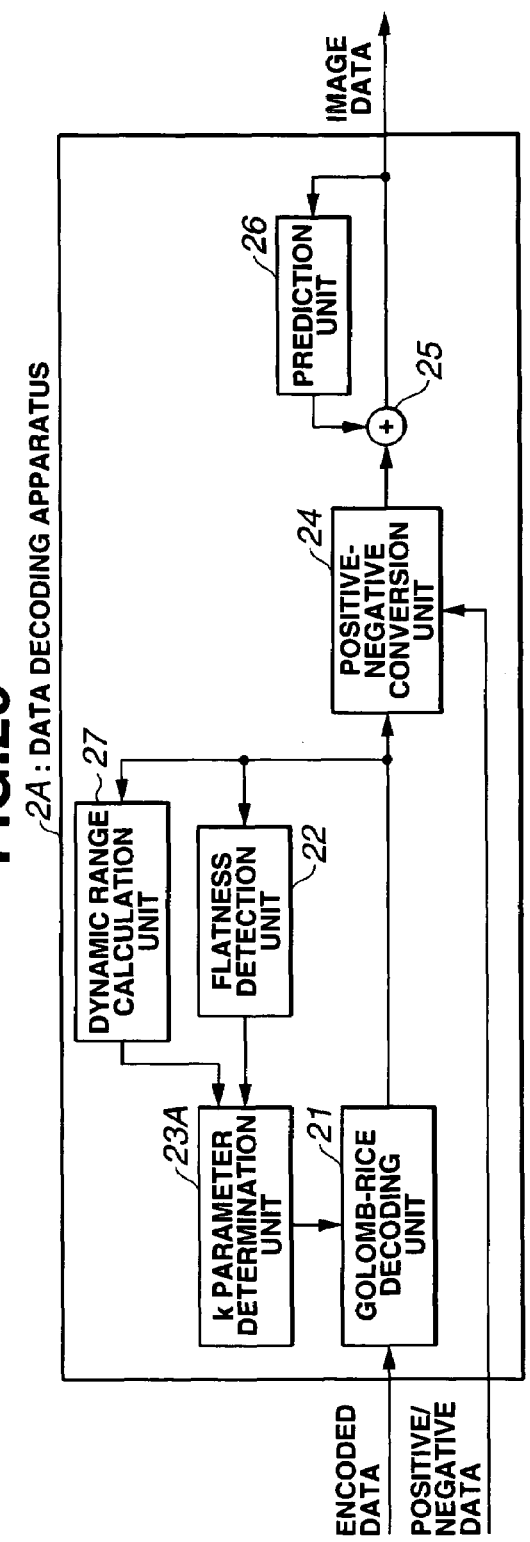
FIG. 29 is a block diagram showing the constitution of a data decoding apparatus in the second embodiment.

FIGS. 28 through 34 show a second embodiment of the present invention, in which FIG. 28 is a block diagram showing the constitution of a data encoding apparatus and FIG. 29 is a block diagram showing the constitution of a data decoding apparatus. In the second embodiment, identical reference symbols have been allocated to parts which are similar to those of the first embodiment, and description thereof has been omitted. The following description focuses on different parts.

A data encoding apparatus 1A of the second embodiment, shown in FIG. 28, has a substantially identical constitution to that of the data encoding apparatus 1 shown in FIG. 1 except that a dynamic range calculation unit 17 is provided in parallel with the flatness detection unit 14, and a k parameter determination unit 15A determines the k parameter using both the detection result of the flatness detection unit 14 and the calculation result of the dynamic range calculation unit 17. The dynamic range calculation unit 17 calculates the dynamic range of the absolute prediction error value abs_pred_diff output from the absolute value calculation unit 13, and outputs the calculation result to the k parameter determination unit 15A. The actions of the data encoding apparatus 1A will be described in detail below with reference to FIG. 30 and so on.

Data compressed by the data encoding apparatus 1A are decoded by a data decoding apparatus 2A such as that shown in FIG. 29. More specifically, the data decoding apparatus 2A of the second embodiment is constituted substantially identically to the data decoding apparatus 2 shown in FIG. 2 except that a dynamic range calculation unit 27 is provided in parallel with the flatness detection unit 22, and a k parameter determination unit 23A determines the k parameter using both the detection result of the flatness detection unit 22 and the calculation result of the dynamic range calculation unit 27. The dynamic range calculation unit 27 calculates the dynamic range of the absolute prediction error value abs_pred_diff output from the Golomb-Rice decoding unit 21, and outputs the calculation result to the k parameter determination unit 23A.

Note that in FIGS. 28 and 29, the operation timing of each block is adjusted by a timing adjustment circuit not shown in the drawings.

Figure 30:
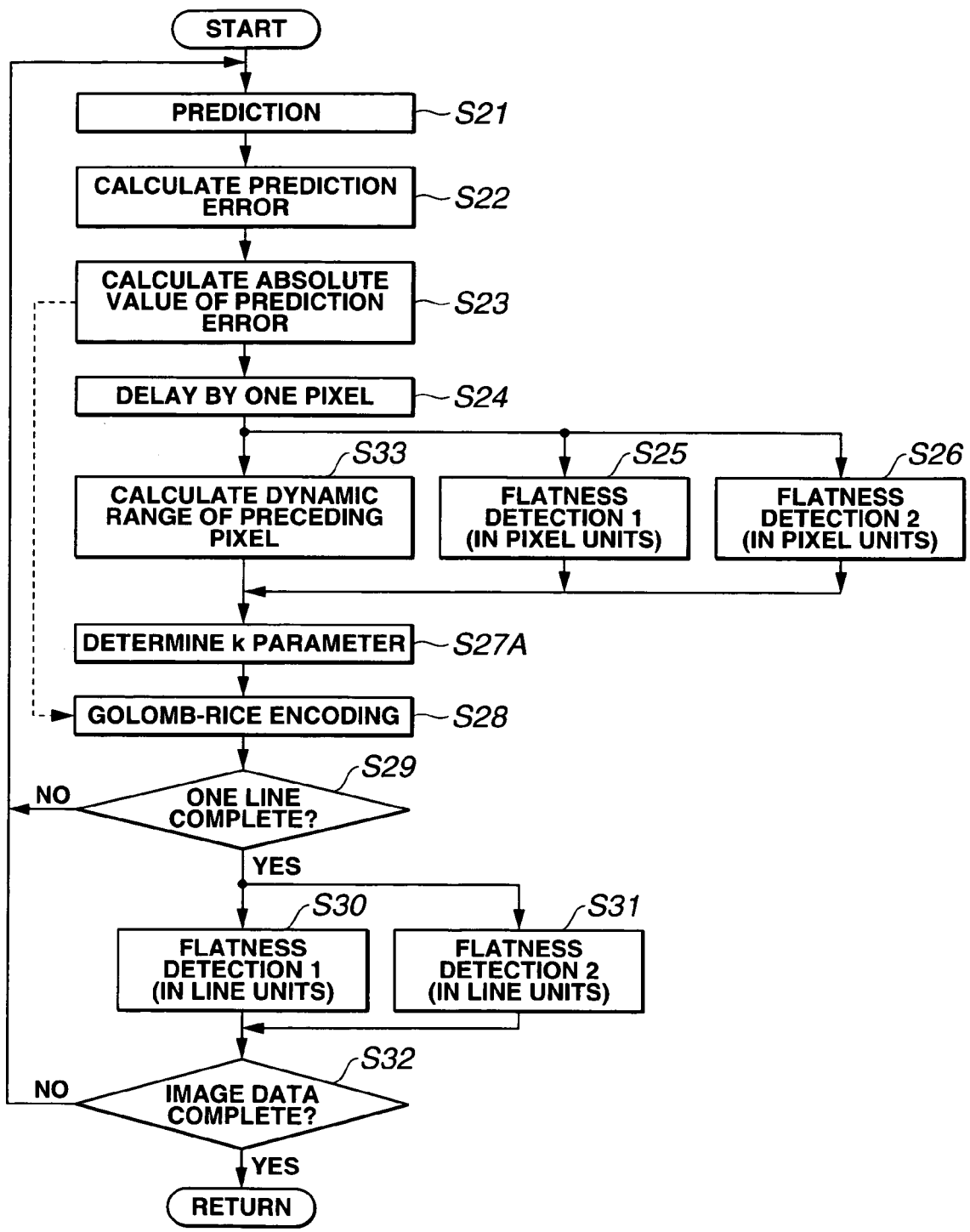
FIG. 30 is a flowchart showing in detail the compression processing performed by the data encoding apparatus of the second embodiment.

FIG. 30 is a flowchart showing in detail the compression processing performed by the data encoding apparatus 1A. In the processing shown in FIG. 30, identical reference symbols have been allocated to parts which are similar to those shown in FIG. 6 of the first embodiment, and description thereof has been omitted. The following description focuses on different parts.

In this processing, the absolute prediction error value abs_pred_diff is delayed by one pixel by the processing of the step S24, whereupon the pixel-unit flatness detection 1 processing of the step S25 and the pixel-unit flatness detection 2 processing of the step S26 are performed in parallel with processing to calculate the dynamic range of the preceding pixel (step S33).

In the processing of the step S33, the effective bit count of the pixel value part of the preceding pixel is calculated. More specifically, the dynamic range calculation unit 17, which serves as dynamic range calculating means, detects the pixel value of the preceding pixel one bit at a time from the upper order bit side to the lower order bit side, and first determines the column of bits for which a bit value is not "0" (i.e. a bit value of "1") is obtained. The dynamic range determined at this time is set as pre_range.

Next, on the basis of the results of the processing performed in the steps S25, S26, S33, i.e. the k parameter candidate k_param1 calculated in the step S25, the k parameter candidate k_param2 calculated in the step S26, and the dynamic range pre_range calculated in the step S33, the k parameter determination unit 15A, which serves as the code length setting means, determines the k parameter k_param in the manner shown in the following Formula 13 (step S27A).

$$k\_param=\max(pre\_range,\min(k\_param1,k\_param2)) \quad \text{[Formula 13]}$$

In other words, here either larger value of the dynamic range pre_range and either smaller value of the k parameter candidate k_param1 and the k parameter candidate k_param2 is set as the k parameter k_param.

All other processing is similar to the processing shown in FIG. 6 of the first embodiment.

Next, referring to FIGS. 31 and 32, a specific example of the encoding of a single line of image data having a comparatively high degree of randomness will be described.

Here, FIG. 31 is a table showing values of the run counter and the k parameter, set in accordance with the absolute prediction error data shown in FIG. 18, and FIG. 32 is a table showing the compression ratio obtained by the techniques of the second embodiment in relation to the image data shown in FIG. 16, in comparison with a compression ratio obtained when the k parameter is fixed.

Here, an example will be described in which prediction error values such as those shown in FIG. 17 and absolute prediction error values such as those shown in FIG. 18 are calculated from the image data shown in FIG. 16, and the absolute prediction error values are compressed on the basis of a k parameter calculated by the means of the second embodiment. The thresholds and set values used during flatness detection by the flatness detection unit 14 are similar to those shown in FIG. 13.

Of the various values shown in FIG. 31, the values of the absolute prediction error data, the run counter run_count1, the run counter run_count2, the k parameter candidate k_param1, and the k parameter candidate k_param2 are identical to those shown in FIG. 20.

In the second embodiment, the dynamic range pre_range is also calculated. When the target pixel is the pixel at the head of the line (the first pixel), no preceding pixel exists, and therefore the dynamic range pre_range is set at a predetermined value of "5", for example.

Next, in the second pixel, the value of the absolute prediction error data of the first pixel, which is the preceding pixel delayed by one pixel, is "49", or in other words "00110001" when expressed in 8 bits. Hence, the effective bit part is constituted of the six bits "110001" and "6" is set as the dynamic range pre_range. Thereafter, the dynamic range pre_range is set similarly in sequence. Note, however, that when the value of the absolute prediction error data is "0", "1" is set as the dynamic range pre_range.

Once the k parameter candidate k_param1, the k parameter candidate k_param2, and the dynamic range pre_range have been all present in this manner, the k parameter k_param is determined in accordance with Formula 13. For example, in the sixth pixel the k parameter candidate k_param1 is "2" and the k parameter candidate k_param2 is "4", and hence in the first embodiment, "2" is set as the k parameter k_param, whereas in the second embodiment, the dynamic range pre_range is "3", and therefore "3" is set as the k parameter k_param.

FIG. 32 shows a comparison between the results of encoding performed by the Golomb-Rice encoding unit 16 using the adaptively calculated k parameter k_param and the results of encoding performed by the Golomb-Rice encoding unit 16 using a fixed k parameter k_param.

First, the data amount for 32 pixels is 256 bits, as described above. In addition, the code amount and compression ratio when the k parameter is fixed at 2 and the code amount and compression ratio when the k parameter is fixed at 5 are similar to those shown in FIG. 21.

In contrast, when an adaptive k parameter such as that described above in this embodiment is used, the code amount is 207 and the compression ratio is 81, and hence it is possible to obtain a comparatively high compression ratio which is substantially identical to the compression ratio obtained when the k parameter is fixed at 5 or the compression ratio obtained when the adaptively determined k parameter of the first embodiment is used.

Next, a specific example of the encoding of a single line of image data having a comparatively low degree of randomness will be described with reference to FIGS. 33 and 34.

Here, FIG. 33 is a table showing values of the run counter and the k parameter, set in accordance with the absolute prediction error data shown in FIG. 24, and FIG. 34 is a table showing the compression ratio obtained by applying the techniques of the second embodiment on the image data shown in FIG. 22, with being contrasted with the compression ratio obtained when the k parameter is fixed.

Here, an example will be described in which prediction error values such as those shown in FIG. 23 and absolute prediction error values such as those shown in FIG. 24 are calculated from the image data shown in FIG. 22, and the absolute prediction error values are compressed on the basis of a k parameter calculated by the means of the second embodiment. The thresholds and set values used during flatness detection by the flatness detection unit 14 are similar to those shown in FIG. 13.

Of the various values shown in FIG. 33, the values of the absolute prediction error data, the run counter run_count1, the run counter run_count2, the k parameter candidate k_param1, and the k parameter candidate k_param2 are identical to those shown in FIG. 26.

In the second embodiment, the dynamic range pre_range is calculated as described above.

Once the k parameter candidate k_param1, the k parameter candidate k_param2, and the dynamic range pre_range have been all present in this manner, the k parameter k_param is determined in accordance with Formula 13.

FIG. 34 shows a comparison between the results of encoding performed by the Golomb-Rice encoding unit 16 using the adaptively calculated k parameter k_param and the results of encoding performed by the Golomb-Rice encoding unit 16 using a fixed k parameter k_param.

First, the data amount for 32 pixels is 256 bits, as described above. In addition, the code amount and compression ratio when the k parameter is fixed at 2 and the code amount and compression ratio when the k parameter is fixed at 5 are similar to those shown in FIG. 27.

In contrast, when an adaptive k parameter such as that described above in the second embodiment is used, the code amount is 118 and the compression ratio is 46, and hence it is possible to obtain a comparatively high compression ratio which is substantially identical to the compression ratio obtained when the k parameter is fixed at 2 or the compression ratio obtained when the adaptively determined k parameter of the first embodiment is used.

Comparing the results shown in FIG. 32 with the results shown in FIG. 34, it is evident that, according to the second embodiment, a higher compression ratio can be achieved with stability in relation to both data having a high degree of randomness and data having a low degree of randomness than when the k parameter is fixed.

Further, during decoding by the data decoding apparatus 2A, the dynamic range calculation unit 27 serving as dynamic range calculating means calculates the dynamic range in a similar manner to the dynamic range calculation unit 17 described above after the absolute prediction error value, decoded by the Golomb-Rice decoding unit 21, is delayed by one pixel.

The k parameter determination unit 23A, serving as the code length setting means, then determines the k parameter similarly to the k parameter determination unit 15A described above, in accordance with Formula 13.

All other actions of the data decoding apparatus 2A are identical to those of the data decoding apparatus 2 in the first embodiment.

According to the second embodiment, substantially identical effects in the first embodiment are achieved, and in addition to flatness detection, the dynamic range of the preceding pixel is calculated such that the k parameter is determined on the basis of the detected flatness and the calculated dynamic range. As a result, a high compression ratio can be achieved with respect to a greater variety of image modes.

Here, the dynamic range is calculated simply by detecting the effective bit count of the preceding pixel, and hence the required memory amount can be reduced and the processing speed can be increased.

Note that in the above description, image data are cited as an example of data for processing, but needless to say, the data that can be processed by the data encoding apparatus and data decoding apparatus are not limited thereto.

Also in the above description, processing is performed by the data encoding apparatus and data decoding apparatus, but processing may be per formed by applying the data encoding method and data decoding method to a conventional calculator or the like. Alternatively, a program for performing equivalent processing to that performed by the data encoding apparatus and data decoding apparatus may be recorded onto a recording medium, and the program recorded on the recording medium may be executed by a computer.

Also in the above description, Golomb-Rice encoding and Golomb-Rice decoding are cited respectively as examples of encoding and decoding, but the present invention is not limited thereto, and any encoding technique in which data are divided into a variable length code part and a fixed length code part may be applied. Accordingly, the encoding subject is not limited to the absolute value of a corrected prediction error value.

Having described the preferred embodiments of the invention referring to the accompanying drawings, it should be understood that the present invention is not limited to these precise embodiments and various changes and modifications thereof could be made by one skilled in the art without departing from the spirit or scope of the invention as defined in the appended claims.

What is claimed is:

1. A data encoding apparatus comprising:
a data converter adapted to convert data into prediction error data through adaptive prediction of the data;
a run counter adapted to detect the number of pieces of the prediction error data, without a break, equal to or lower than a predetermined threshold;
a code length setting portion adapted to set a code length of a fixed length code part of the prediction error data in accordance with the number detected by the run counter; and
an encoder adapted to encode the prediction error data by dividing the prediction error data into a variable length code part and the fixed length code part.

2. The data encoding apparatus according to claim 1, wherein the code length setting portion is adapted to set the code length to be shorter when the number detected by the run counter is equal to or higher than a predetermined run length than the code length set when the number detected by the run counter is lower than the predetermined run length.

3. The data encoding apparatus according to claim 1, wherein a plurality of threshold types can be set as the threshold, and
in relation to each of the plurality of set threshold types, the run counter detects the number of pieces of the prediction error data, without a break, equal to or lower than the threshold.

4. The data encoding apparatus according to claim 3, wherein the code length setting portion is adapted to set a first code length, which is obtained when the number detected by the run counter in relation to a first threshold is equal to or higher than a predetermined run length, to be shorter than a second code length obtained when the number detected by the run counter in relation to a second threshold, which is greater than the first threshold, is equal to or higher than the predetermined run length.

5. The data encoding apparatus according to claim 4, further comprising a dynamic range calculator adapted to detect an effective bit count of the prediction error data as a dynamic range,
wherein the code length setting portion is further adapted to set either larger value of the dynamic range and either smaller value of the first code length and the second code length as the code length of the fixed length code part of the prediction error data.

6. A data encoding method comprising:
converting data into prediction error data through adaptive prediction of the data;
detecting, using a run counter, the number of pieces of the prediction error data, without a break, equal to or lower than a predetermined threshold;
setting a code length of a fixed length code part of the prediction error data in accordance with the detected number; and
encoding the prediction error data by dividing the prediction error data into a variable length code part and the fixed length code part.

7. A recording medium recorded with a computer executable program which, when executed by a computer, performs a method comprising:
converting data into prediction error data through adaptive prediction of the data;
detecting, using a run counter, the number of pieces of the prediction error data, without a break, equal to or lower than a predetermined threshold;
setting a code length of a fixed length code part of the prediction error data in accordance with the detected number; and
encoding the prediction error data by dividing the prediction error data into a variable length code part and the fixed length code part.

8. A data decoding apparatus comprising:
a prediction error data decoder adapted to determine prediction error data by dividing encoded data into a variable length code part and a fixed length code part to decode the encoded data;
a target data decoder adapted to adaptively determine target data from the prediction error data decoded by the prediction error data decoder;
a run counter adapted to detect, with respect to prediction error data relating to data immediately preceding the target data decoded by the prediction error data decoder, the number of pieces of the prediction error data, without a break, equal to or lower than a predetermined threshold; and
a code length setting portion adapted to set a code length of the fixed length code part of the encoded data in accordance with the number detected by the run counter,
wherein the prediction error data decoder is adapted to decode the encoded data by dividing the encoded data into the variable length code part and the fixed length code part in accordance with the code length set by the code length setting portion, thereby determining the prediction error data.

9. The data decoding apparatus according to claim 8, wherein the code length setting portion is adapted to set the code length to be shorter when the number detected by the run counter is equal to or higher than a predetermined run length than the code length set when the number detected by the run counter is lower than the predetermined run length.

10. The data decoding apparatus according to claim 8, wherein a plurality of threshold types can be set as the threshold, and
in relation to each of the plurality of set threshold types, the run counter is adapted to detect the number of pieces of the prediction error data, without a break, equal to or lower than the threshold.

11. The data decoding apparatus according to claim 10, wherein the code length setting portion is adapted to set a first code length, which is obtained when the number detected by the run counter in relation to a first threshold is equal to or higher than a predetermined run length, to be shorter than a second code length obtained when the number detected by the run counter in relation to a second threshold; which is greater than the first threshold, is equal to or higher than the predetermined run length.

12. The data decoding apparatus according to claim 11, further comprising a dynamic range calculator for detecting an effective bit count of the prediction error data as a dynamic range,
wherein the code length setting portion is adapted to set either larger value of the dynamic range and either smaller value of the first code length and the second code length as the code length of the fixed length code part of the prediction error data.

13. A data decoding method comprising:
  determining prediction error data by dividing encoded data into a variable length code part and a fixed length code part to decode the encoded data;
  determining adaptively target data from the decoded prediction error data;
  detecting, with respect to prediction error data relating to data immediately preceding the decoded target data, the number of pieces of the prediction error data consistently equal to or lower than a predetermined threshold; and
  setting a code length of the fixed length code part of the encoded data in accordance with the detected number,
  wherein, in the step of determining prediction error data, the encoded data are decoded by dividing the encoded data into the variable length code part and the fixed length code part in accordance with the code length set in the step of setting the code length of the fixed length code part, and thus the prediction error data are determined.

14. A recording medium recorded with a computer-executable program which, when executed by a computer, performs a method comprising:
  determining prediction error data by dividing encoded data into a variable length code part and a fixed length code part to decode the encoded data;
  determining adaptively target data from the decoded prediction error data;
  detecting, with respect to prediction error data relating to data immediately preceding the decoded target data, the number of pieces of the prediction error data consistently equal to or lower than a predetermined threshold; and
  setting a code length of the fixed length code part of the encoded data in accordance with the detected number,
  wherein, in the step of determining prediction error data, the encoded data are decoded by dividing the encoded data into the variable length code part and the fixed length code part in accordance with the code length set in the step of setting the code length of the fixed length code part, and thus the prediction error data are determined.

* * * * *